(12) United States Patent
Natsumeda

(10) Patent No.: US 11,755,004 B2
(45) Date of Patent: Sep. 12, 2023

(54) ANALYSIS SYSTEM, ANALYSIS METHOD, AND STORAGE MEDIUM

(71) Applicant: NEC CORPORATION, Tokyo (JP)

(72) Inventor: Masanao Natsumeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 906 days.

(21) Appl. No.: 16/628,827

(22) PCT Filed: Jul. 13, 2017

(86) PCT No.: PCT/JP2017/025560
§ 371 (c)(1),
(2) Date: Jan. 6, 2020

(87) PCT Pub. No.: WO2019/012654
PCT Pub. Date: Jan. 17, 2019

(65) Prior Publication Data
US 2021/0373542 A1   Dec. 2, 2021

(51) Int. Cl.
*G05B 23/02* (2006.01)
*G06N 5/022* (2023.01)
*G06F 18/2113* (2023.01)

(52) U.S. Cl.
CPC ....... *G05B 23/024* (2013.01); *G05B 23/0221* (2013.01); *G05B 23/0227* (2013.01); *G06F 18/2113* (2023.01); *G06N 5/022* (2013.01)

(58) Field of Classification Search
CPC ............ G05B 23/0221; G05B 23/0227; G05B 23/024; G06K 9/623; G06N 5/022; G06F 18/2113

(Continued)

(56) References Cited

U.S. PATENT DOCUMENTS 8,682,824 B2 * 3/2014 Shibuya ............... G05B 23/021
706/45
9,626,600 B2   4/2017 Liu et al.
(Continued)

FOREIGN PATENT DOCUMENTS

JP    2007-286995 A    11/2007
JP    2012-098181 A     5/2012
(Continued)

OTHER PUBLICATIONS

Hochheiser, Harry, et al., "Dynamic query tools for time series data sets: Timebox widgets for interactive exploration", Information Visualization, Palgrave Macmillan © 2004, pp. 1-18.*
(Continued)

*Primary Examiner* — Robert Stevens

(57) ABSTRACT

Provided is an analysis system including: an analysis unit including a classifier that performs classification of an event type on input time-series data; a display information generation unit that generates first display information used for displaying, out of the time-series data, first time-series data in which association of an event type is undecided and which is classified by the classifier as a first event type corresponding to a state where a target event is occurring, second time-series data associated with the first event type, and third time-series data associated with a second event type corresponding to a state where the target event is not occurring; and an input unit that accepts first input regarding association of an event type with the first time-series data.

11 Claims, 18 Drawing Sheets

(58) Field of Classification Search
 USPC .......................................................... 707/183
 See application file for complete search history.

(56) References Cited

U.S. PATENT DOCUMENTS

| | | | | |
|---|---|---|---|---|
| 10,505,825 | B1* | 12/2019 | Bettaiah | ................ G06F 16/285 |
| 2004/0220782 | A1* | 11/2004 | Cook | ...................... G16Z 99/00 |
| | | | | 702/189 |
| 2007/0247524 | A1 | 10/2007 | Yoshinaga et al. | |
| 2009/0292662 | A1* | 11/2009 | Ueno | .................... G06Q 10/04 |
| | | | | 706/46 |
| 2010/0325489 | A1* | 12/2010 | Nakadai | ............. G06F 11/0748 |
| | | | | 714/E11.029 |
| 2011/0289033 | A1* | 11/2011 | Gargi | ................ G06K 9/00523 |
| | | | | 706/20 |
| 2012/0041575 | A1* | 2/2012 | Maeda | ................ G05B 23/024 |
| | | | | 700/79 |
| 2012/0117069 | A1* | 5/2012 | Kawanishi | ............ G06V 20/10 |
| | | | | 707/740 |
| 2012/0290879 | A1* | 11/2012 | Shibuya | ............... G05B 23/021 |
| | | | | 714/26 |
| 2014/0279795 | A1* | 9/2014 | Shibuya | ............ G05B 23/0221 |
| | | | | 706/46 |
| 2015/0220847 | A1* | 8/2015 | Shibuya | ................ G06N 20/00 |
| | | | | 706/12 |
| 2016/0140422 | A1 | 5/2016 | Saruta | |
| 2016/0321330 | A1* | 11/2016 | Ziegler | ............... G06F 3/04817 |
| 2017/0061285 | A1* | 3/2017 | Hikone | ................... G06N 20/00 |
| 2018/0189700 | A1* | 7/2018 | Fuke | ...................... G06N 20/00 |

FOREIGN PATENT DOCUMENTS

| | | |
|---|---|---|
| JP | 2013-025367 A | 2/2013 |
| JP | 2013-105377 A | 5/2013 |
| JP | 2014-211837 A | 11/2014 |
| JP | 2014-235603 A | 12/2014 |
| JP | 2015-088078 A | 5/2015 |
| JP | 5769138 B2 | 8/2015 |
| JP | 2015-172945 A | 10/2015 |
| JP | 2016-099734 A | 5/2016 |
| JP | 2016-143104 A | 8/2016 |

OTHER PUBLICATIONS

Krstajić, Miloš, et al., "Cloudlines: Compact Display of Event Episodes in Multiple Time-Series", IEEE Transactions on Visualization and Computer Graphics, vol. 17, No. 2, Dec. 2011, pp. 2432-2439.*

International Search Report for PCT/JP2017/025560, dated Oct. 3, 2017, 2 pages.

* cited by examiner

ANALYSIS SYSTEM, ANALYSIS METHOD, AND STORAGE MEDIUM

CROSS REFERENCE TO RELATED APPLICATIONS

This application is a National Stage of International Application No. PCT/JP2017/025560 filed Jul. 13, 2017.

TECHNICAL FIELD

The present invention relates to an analysis system, an analysis method, and a storage medium.

BACKGROUND ART

Various studies regarding an anomaly detection scheme used for management of a plant or the like have been made. An event analysis device of Patent Literature 1 has a Bayesian network generation unit that generates a Bayesian network based on an event log including occurrence date and time, a device identifier, and an event type identifier. The event analysis device can analyze a device event by using a Bayesian network and thereby recognize a causal relationship of events.

A plant monitoring apparatus of Patent Literature 2 has an inspection execution signal input unit to which an inspection execution signal that identifies the attribute of inspection work is input from a plant when inspection work is implemented. In accordance with whether or not an inspection execution signal is input, it is possible to determine whether or not an anomaly of a process signal is caused by inspection when the anomaly is detected, and it is therefore possible to reduce a workload for anomaly analysis.

CITATION LIST

Patent Literature

PTL 1: Japanese Patent Application Laid-Open No. 2014-211837
PTL 2: Japanese Patent Application Laid-Open No. 2014-235603

SUMMARY OF INVENTION

Technical Problem

In the arts disclosed in Patent Literature 1 and Patent Literature 2, the workload required for associating data and events is large, which may cause a problem of a large management burden.

The present invention has been made in view of the above problem and intends to provide an analysis system, an analysis method, and a storage medium that can reduce a management burden.

Solution to Problem

According to one example aspect of the present invention, provided is an analysis system including: an analysis unit including a classifier that performs classification of an event type on input time-series data; a display information generation unit that generates first display information used for displaying, out of the time-series data, first time-series data in which association of an event type is undecided and which is classified by the classifier as a first event type corresponding to a state where a target event is occurring, second time-series data associated with the first event type, and third time-series data associated with a second event type corresponding to a state where the target event is not occurring; and an input unit that accepts first input regarding association of an event type with the first time-series data.

Advantageous Effects of Invention

According to the present invention, an analysis system, an analysis method, and a storage medium that can reduce a management burden can be provided.

DESCRIPTION OF EMBODIMENTS

Example embodiments of the present invention will be described below with reference to the drawings. Note that, throughout the drawings described below, elements having the same function or a corresponding function are labeled with the same reference, and the repeated description thereof may be omitted.

First Example Embodiment

Figure 1:
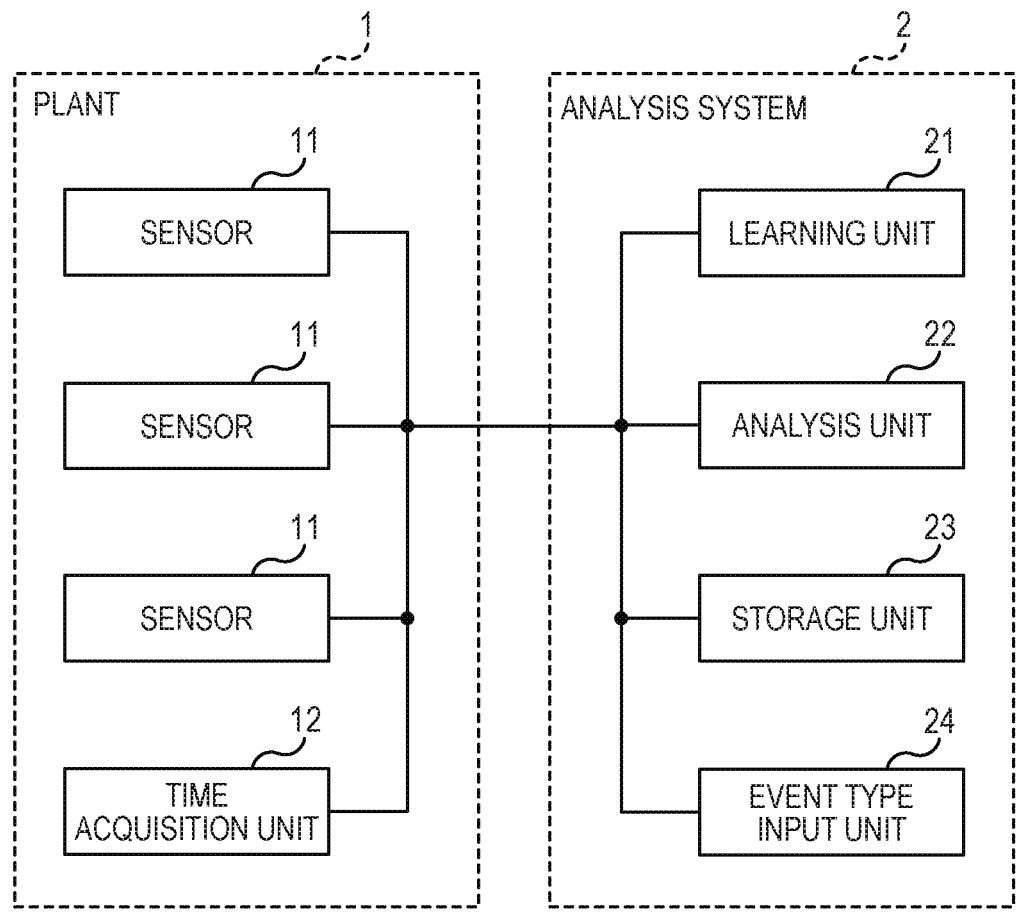
FIG. 1 is a schematic block diagram illustrating the entire configuration of a plant and an analysis system according to a first example embodiment of the present invention.

An analysis system 2 according to a first example embodiment of the present invention will be described. First, a general configuration including the analysis system 2 according to the present example embodiment and a plant 1 that is an analysis target will be described by using FIG. 1. FIG. 1 is a schematic block diagram illustrating the entire configuration of the plant 1 and the analysis system 2 according to the present example embodiment.

As illustrated in FIG. 1, the analysis system 2 that analyzes the state of the plant 1 is communicably connected to the plant 1 by wire or wirelessly. The plant 1 may be, for example, a chemical plant, a power plant, a medicine factory, an assembly factory, or the like. The analysis system 2 may be, for example, a monitoring apparatus of the plant 1.

In the plant 1, a plurality of sensors 11 for monitoring the state of apparatus installed inside the plant 1, the state of a fluid flowing in a piping, or the like and a time acquisition unit 12 are provided. The sensors 11 may be, for example, a temperature sensor, a humidity sensor, a pressure sensor, a flowrate sensor, or the like. While three sensors 11 are depicted in FIG. 1, this is exemplary illustration, and any number of sensors 11 may be provided.

The time acquisition unit 12 acquires the current time used for determining output data of the plurality of sensors 11 as time-series data associated with data output time. The time acquisition unit 12 may be a real-time clock provided in a control device of the plurality of sensors 11, for example. With such a configuration, the plant 1 supplies time-series data based on the output of the plurality of sensors 11 to the analysis system 2. Such time-series data may be, for example, time-series data of measurement values of a temperature, a humidity, or the like inside an apparatus provided within the plant 1, time-series data of measurement values of a pressure, a flowrate, or the like inside a piping provided within the plant 1, or the like. Note that, while the configuration in which a single time acquisition unit 12 is provided to the plurality of sensors 11 as illustrated in FIG. 1 may be employed, a configuration in which a plurality of time acquisition units 12 corresponding to the plurality of sensors 11 are provided may be employed. Further, the time acquisition unit 12 may be provided on the analysis system 2 side.

The analysis system 2 has a learning unit 21, an analysis unit 22, a storage unit 23, and an event type input unit 24. The storage unit 23 stores time-series data output from the plant 1 as data indicating the state of the plant 1. The event type input unit 24 is an input interface that associates the type of an event occurring in the plant 1 with each period of time-series data partitioned into predetermined periods. Such association of an event type is input by a manager of the analysis system 2. Accordingly, the storage unit 23 stores time-series data with which an event type is associated. Note that "event" means a state of the plant 1 at each time. For example, a state where inspection work on a facility, a piping, or the like is performed by an inspection worker within the plant 1, a state where manual work on a facility is performed by a worker, or the like is one type of "event". Further, as described later, a normal operation state and an abnormal operation state are included in "event".

The learning unit 21 converts time-series data stored in the storage unit 23 into a feature amount and uses this feature amount and an event type associated therewith as training data to perform machine learning on a plurality of classifiers. In the present specification, machine learning may be simply referred to as learning. A plurality of trained classifiers are stored in the storage unit 23, for example. The analysis unit 22 converts time-series data stored in the storage unit 23 into a feature amount, uses a plurality of classifiers obtained by learning in the learning unit 21 to classify an event corresponding to the feature amount, and determines an event occurring in the plant 1. The analysis system 2 of the present example embodiment can automatically determine the event type (for example, normal operation, inspection work, abnormal operation, or the like) that occurred in the plant 1 and can perform anomaly detection or the like of the plant 1.

The configuration illustrated in FIG. 1 is one example, the configuration can be changed if necessary as long as time-series data obtained in the plant 1 can be analyzed. For example, the analysis system 2 may be configured to be provided inside the plant 1 or may be configured such that the learning unit 21 is provided outside the analysis system 2 as a learning system.

Figure 2:
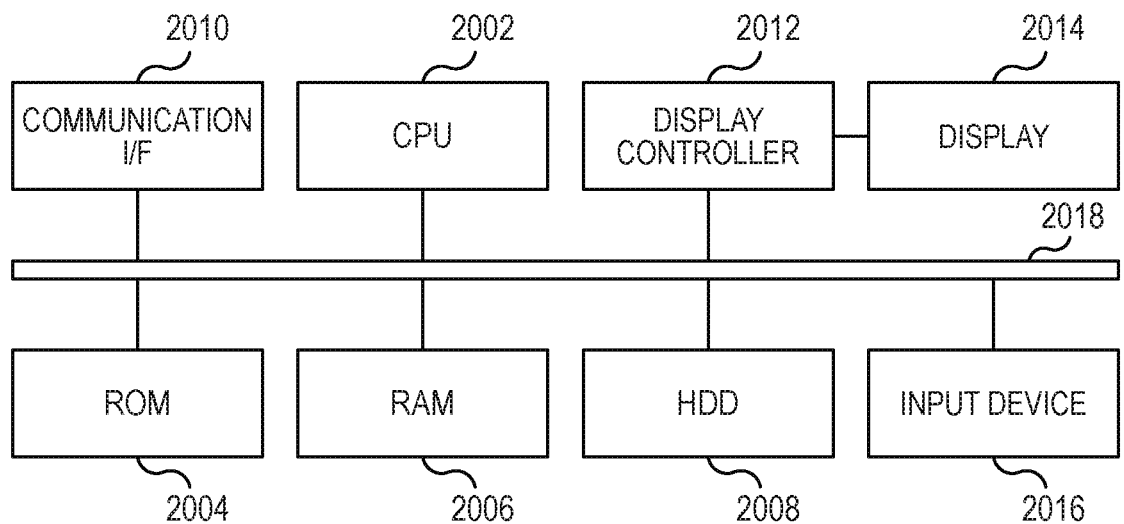
FIG. 2 is a block diagram illustrating a hardware configuration example of the analysis system according to the first example embodiment of the present invention.

A hardware configuration example of the analysis system according to the present example embodiment will be described by using FIG. 2. FIG. 2 is a block diagram illustrating a hardware configuration example of the analysis system 2 according to a second example embodiment. Note that the analysis system 2 may be formed of a single device or may be formed of two or more physically separate devices communicably connected by wire or wirelessly.

As illustrated in FIG. 2, the analysis system 2 has a central processing unit (CPU) 2002, a read only memory (ROM) 2004, a random access memory (RAM) 2006, and a hard disk drive (HDD) 2008. Further, the analysis system 2 has a communication interface (I/F) 2010. Further, the analysis system 2 has a display controller 2012 and a display 2014. Furthermore, the analysis system 2 has an input device 2016. The CPU 2002, the ROM 2004, the RAM 2006, the HDD 2008, the communication I/F 2010, the display controller 2012, and the input device 2016 are connected to a common bus line 2018.

The CPU 2002 performs overall control and calculation processes of the analysis system 2. The CPU 2002 implements the function of each unit in the analysis system 2 by loading a program stored in the HDD 2008 or the like to the RAM 2006 and executing the program.

The ROM 2004 stores a program such as a boot program. The RAM 2006 is used as a working area when the CPU 2002 executes a program. Further, the HDD 2008 stores a program executed by the CPU 2002.

Further, the HDD 2008 is a storage device that implements a storage function in the analysis system 2, such as storage unit 23. Note that the storage device used in the analysis system 2 is not limited to the HDD 2008 as long as it is nonvolatile type and may be, for example, a flash memory or the like.

The communication I/F 2010 controls communication of data with the plant 1 via a network. The display 2014 that provides the function as a display unit is connected to the display controller 2012. The display controller 2012 functions as an output unit together with the CPU 2002 that outputs data regarding an image to be displayed, and an image based on the output data is displayed on the display 2014.

The input device 2016 is a hardware component such as a keyboard, a mouse, or the like by which the user performs entry to the event type input unit 24. The input device 2016 may be a touchscreen embedded in the display 2014. The manager of the analysis system 2 may input an event type to the analysis system 2, input an execution instruction of a process, or the like via the input device 2016.

Note that the hardware configuration of the analysis system 2 is not limited to the configuration described above and may be various configurations.

Figure 3:
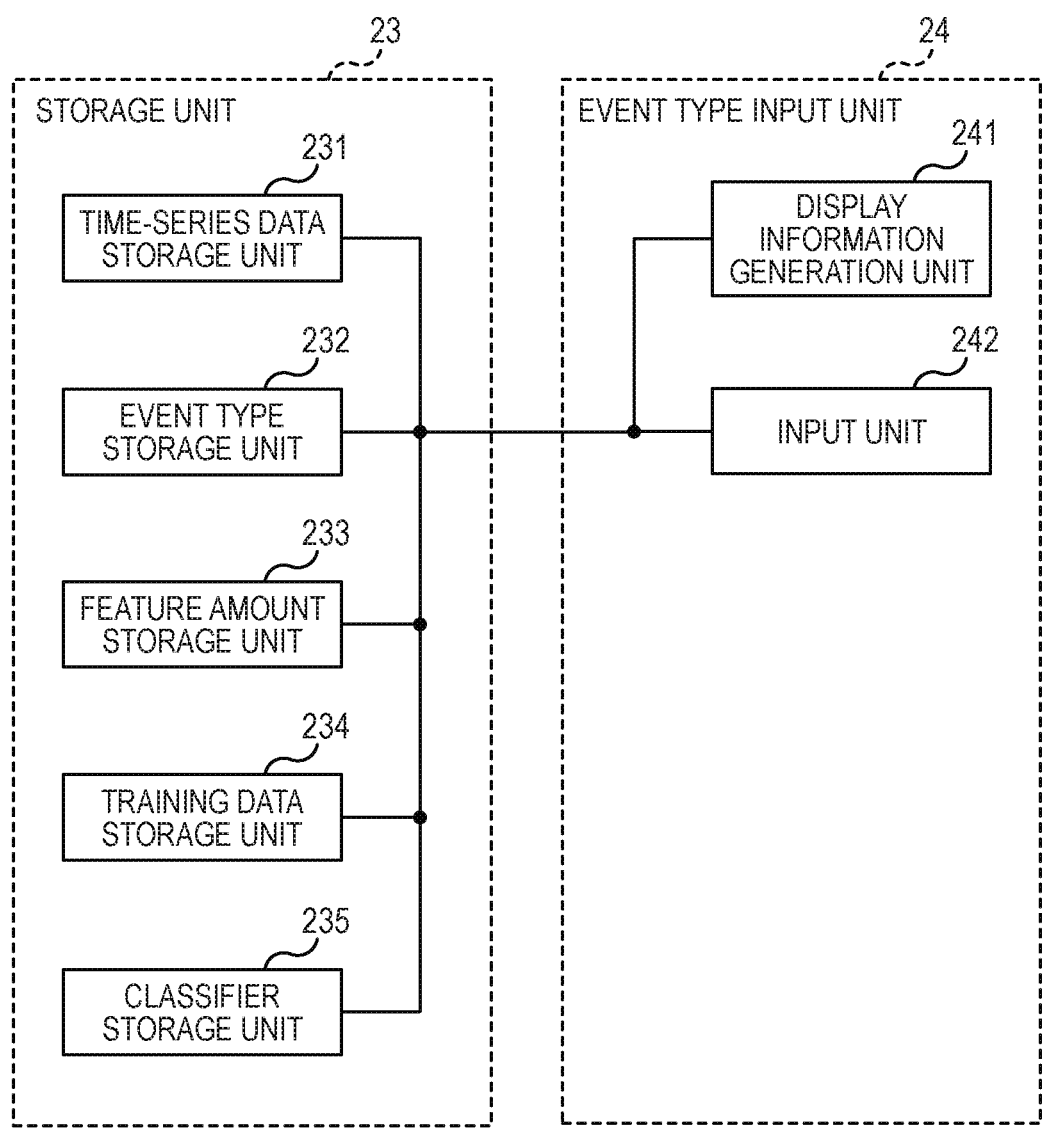
FIG. 3 is a block diagram illustrating a function configuration of a storage unit and an event type input unit according to the first example embodiment of the present invention.

FIG. 3 is a block diagram illustrating a function configuration of the storage unit 23 and the event type input unit 24 according to the present example embodiment. The storage unit 23 has a time-series data storage unit 231, an event type storage unit 232, a feature amount storage unit 233, a training data storage unit 234, and a classifier storage unit 235. The event type input unit 24 has a display information generation unit 241 and an input unit 242.

Figure 4:
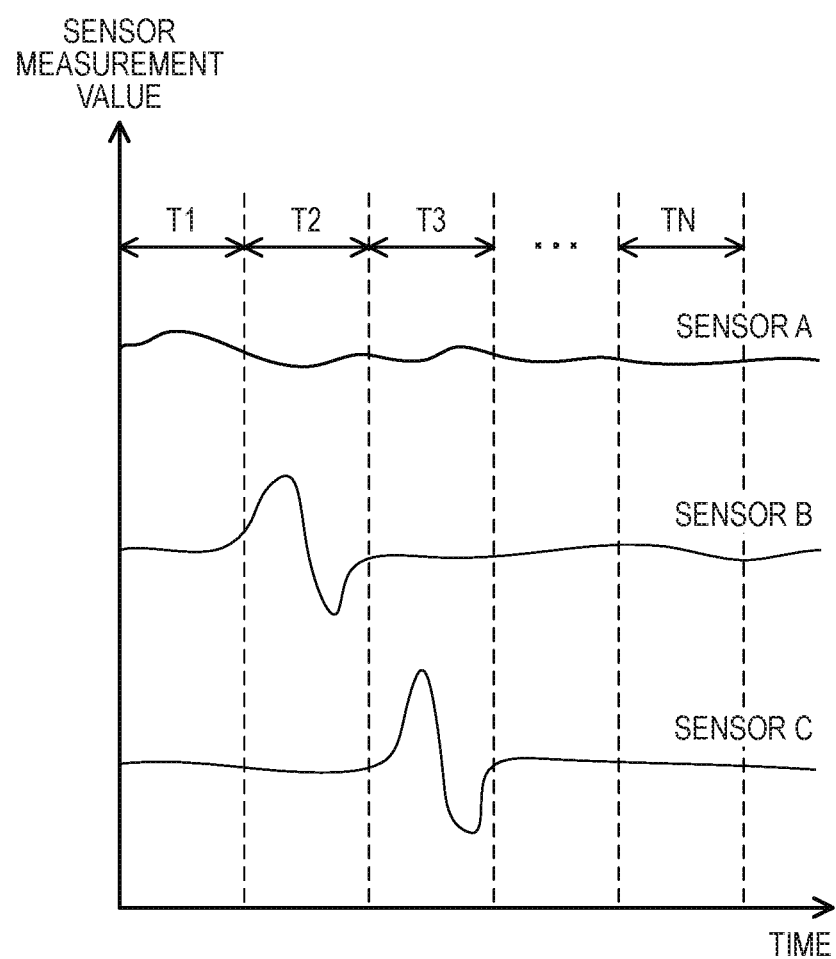
FIG. 4 is a graph illustrating an example of time-series data according to the first example embodiment of the present invention.

The time-series data storage unit 231 stores time-series data output from the plurality of sensors 11. An example of time-series data will be described with reference to FIG. 4. FIG. 4 is a graph illustrating an example of time-series data according to the present example embodiment. FIG. 4 illustrates three examples of temporal fluctuations of measurement values of the sensors 11. The vertical axis of the graph of FIG. 4 is a measurement value of the sensor 11, and the unit thereof is arbitrary. The horizontal axis of the graph of FIG. 4 is time acquired by the time acquisition unit 12. As illustrated in FIG. 4, time-series data is partitioned into N predetermined periods (T1, T2, T3, . . . , TN). Data of respective spans are handled as N separate data, and when the number of sensors 11 is M, it can be said that time-series data stored in the time-series data storage unit 231 includes $Z = N \times M$ data (N is an integer not less than two, and M is an integer not less than one).

Note that, when a measurement value measured by the sensor 11 is stored in the time-series data storage unit 231, the measurement value is converted into digital data so as to be suitable for conversion of a feature amount described later. Specifically, processing such as sampling, quantizing, or the like is performed on time-series data of measurement values measured by the sensor 11, and the time-series data is converted into digital data by an analog-to-digital converter (not illustrated).

The event type storage unit 232 stores event types that are input to the event type input unit 24 by a manager of the analysis system 2 and correspond to respective periods. The input of an event type may be made by the manager inputting an event intended to be a classification target (target event) and the occurrence time thereof to the event type input unit 24, for example. The number of types of target events to be input may be plural. When a plurality of overlapped target events (assumed to be a target event A and a target event B) occur at the same time, this may be handled as there being an occurrence of a target event C that is different from the target event A and the target event B. The input of an event type will be described later in detail.

The feature amount storage unit 233 stores one or a plurality of feature amounts calculated from time-series data stored in the time-series data storage unit 231. An example of a feature amount may be a statistic such as a variance, a standard deviation, a difference (range) between the maximum value and the minimum value, a slope, an average, or the like of measurement values measured by the sensor 11 within a period of interest (for example, within the period T1). When the number of feature amounts calculated for each one set of data is K (K is an integer not less than one), the number of calculated feature amounts is $M \times K$ for each of the N periods, that is, $N \times M \times K$ in total.

Here, a time range in which the manager did not input an occurrence of any event, for example, a time period in which the plant 1 was in a normal operation is handled as there being an occurrence of a different type of event from a target event. Such an event is referred to as a non-target event. That is, when the target event A and the target event B are defined as target events, the event type results in three types of the target event A, the target event B, and a non-target event X. Further, a target event may be referred to as a first event type, and a non-target event may be referred to as a second event type.

The training data storage unit 234 stores training data used for performing supervised machine learning on classifiers included in the learning unit 21. The training data is generated by associating feature amounts stored in the feature amount storage unit 233 and event types stored in the event type storage unit 232 with each other based on respective time or periods thereof.

The classifier storage unit 235 stores a classifier obtained by performing supervised machine learning by using training data stored in the training data storage unit 234. The supervised machine learning performed herein is to determine a feature amount in training data as data required for estimating classification and determine an event type as a correct answer (supervisor) to be estimated based on the feature amount. A scheme used for supervised machine learning may be, for example, a support vector machine, a random forest, a neural network, or the like. The number of classifiers may be plural (assumed to be P). Learning on the P classifiers is performed by using some of data with different combinations from each other, and thereby the generated P classifiers may be of the same type but have different classification criteria from each other.

The display information generation unit 241 generates display information used for causing the display 2014 to display data and graphical user interface (GUI) used for causing the manager of the analysis system 2 to input an event type. The input unit 242 accepts input of association of event type to the GUI displayed on the display 2014. The input association of an event type is stored in the event type storage unit 232.

The present example embodiment relates to a situation where, when an event type is already associated with some of time-series data, this is used as training data, and thereby a trained classifier is generated, association of an event type to another time-series data is further added. By adding association of an event type to enrich training data and perform re-learning on a classifier, it is possible to improve the performance of the classifier. It is therefore assumed that association of an event type to some of time-series data, learning on a classifier, and the like have been performed in advance, and the scheme thereof is not particularly limited.

Figure 5:
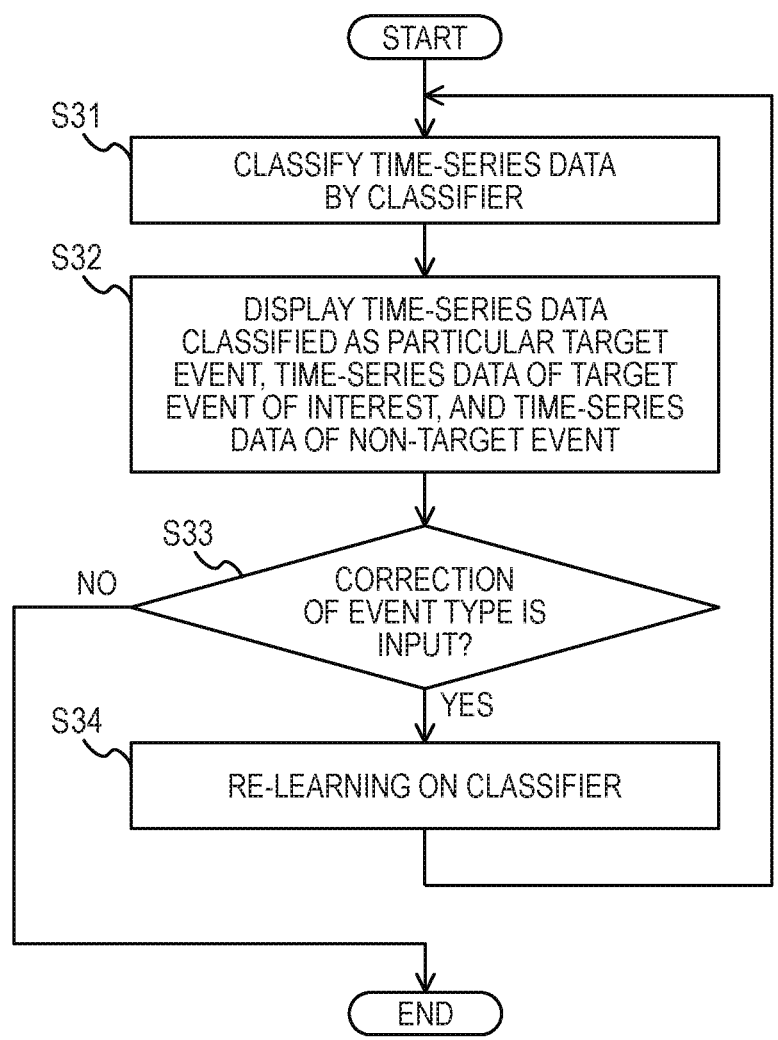
FIG. 5 is a flowchart illustrating an outline of event type input according to the first example embodiment of the present invention.

FIG. 5 is a flowchart illustrating the outline of event type input according to the present example embodiment. The outline of event type input according to the present example embodiment will be described with reference to FIG. 5. Note that the flowchart of FIG. 5 merely illustrates the outline for simplified illustration, and addition of a process, a branch, or the like, change of order, or the like may be performed if necessary.

In step S31, a classifier of the analysis unit 22 acquires, from the feature amount storage unit 233, a feature amount of time-series data in which association with an event type is undecided and classifies the event type. Note that such time-series data may be referred to as a first time-series data.

In step S32, the display information generation unit 241 generates display information. The display information is information used for displaying time-series data classified as a target event by a classifier, time-series data associated with the target event of interest, and time-series data associated with non-target data on the display 2014. Such display information may be referred to as first display information. Further, time-series data associated with the target event of interest may be referred to as second time-series data, and time-series data associated with non-target data may be referred to as third time-series data.

In step S33, the input unit 242 accepts input regarding association of an event type. The content of such input may be referred to as first input. If there is input by the manager to correct an event type, the process proceeds to step S34 (step S33, YES). If an event type classified by a classifier is decided without correction by the manger, since there is no problem in classification made by the classifier, the process ends (step S33, NO). Note that the first time-series data and the corrected event type associated therewith are added in the training data storage unit 234 as training data.

In step S34, the learning unit 21 performs re-learning on the classifier by using training data including the first time-series data on which correction input of an event type has been performed. The process then proceeds to step S31 again, and the same process is repeated.

FIG. 6 to FIG. 12 are window examples used for event type input according to the present example embodiment, which correspond to the GUI used for performing the process of FIG. 5. The window examples used for data display and event type input displayed on the display 2014 based on display information generated by the display information generation unit 241 will be described below with reference to these drawings.

The window examples described below are windows used for adding association of an event type for time-series data. It is assumed that an event type is associated with some of time-series data in advance, this is used as training data, and thereby a trained classifier has been generated. That is, the window examples are entry windows in the assumption of a situation where re-learning on a classifier is performed while increasing training data used for learning in a situation where the number of time-series data with which an event type is associated is small. It is assumed that association of an event type to some of time-series data, learning on a classifier, and the like have already been implemented by another GUI.

Figure 6:
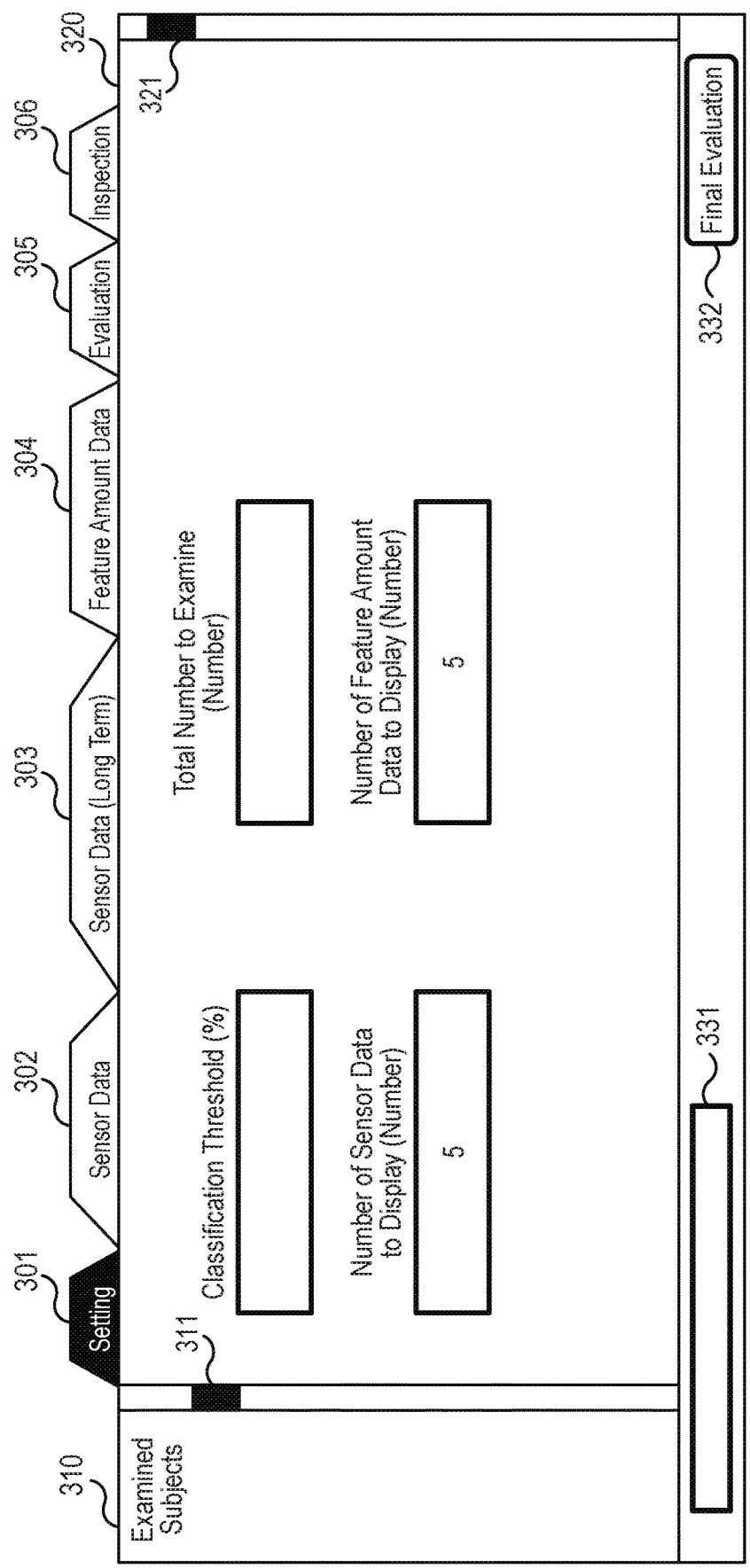
FIG. 6 is a window example used for event type input according to the first example embodiment of the present invention.

FIG. 6 illustrates a display example of a setting window. Tabs 301, 302, 303, 304, 305, and 306 are displayed above the window, and when the manager of the analysis system 2 presses each tab by using a pointing device or the like, the display content of the main window 320 changes to one indicated by the tab. FIG. 6 illustrates that the tab 301 denoting "Setting" is pressed and thereby the setting window is displayed in the main window 320.

Further, a sub-window 310 is displayed on the left side of the main window 320. In the sub-window 310, identifiers attached to time-series data that are examined subjects are listed. By sliding knobs 311 and 321 of scrollbars in the vertical direction provided on the left side of the sub-window 310 and the main window 320, respectively, it is possible to scroll the sub-window 310 and the main window 320 in the vertical direction.

Under the sub-window 310 and the main window 320, a progress bar 331 and a button 322 are displayed. The progress bar 331 displays the progress status of a process. By pressing the button 322 denoting "Final Evaluation" upon completion of input of an event type, it is possible to cause the display in the main window 320 to change to an evaluation window of event classification.

In the main window 320, textboxes labeled with "Classification Threshold (%)", "Number to Examine (Number)", "Number of Sensor Data to Display (Number)", and "Number of Feature Amount Data to Display (Number)" are displayed. The textbox of "Number of Sensor Data to Display (Number)" accepts setting of the number of data to be displayed in a sensor data display window and a sensor data (long term) display window. The textbox of "Number of Feature Amount Data to Display (Number)" accepts setting of the number of data to be displayed in a feature amount data display window.

Figure 7:
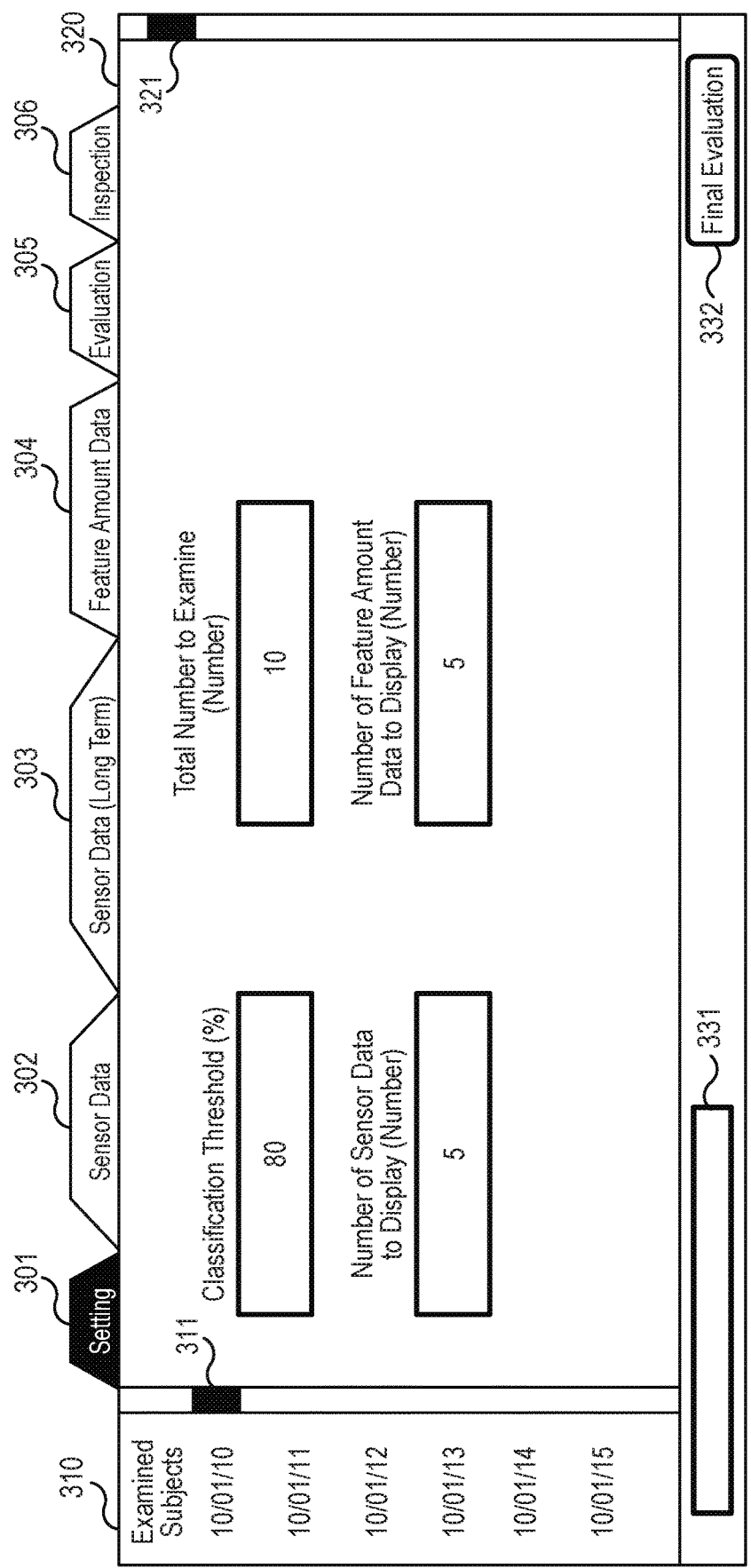
FIG. 7 is a window example used for event type input according to the first example embodiment of the present invention.

The textbox of "Classification Threshold (%)" accepts input of a classification threshold that is a parameter used for event determination in the analysis unit 22. FIG. 7 illustrates a display example of the setting window resulted after the numerical value is input to the textbox of "Classification Threshold (%)". The example of FIG. 7 illustrates that, when "80" is input to the textbox of "Classification Threshold (%)", examined subjects are displayed in the sub-window 310, and the total number of data to be examined, "10", is displayed in the textbox of "Number to Examine (Number)".

The classification threshold will be described. The classification threshold is one of the parameters that define conditions for determining an event type from a classification result obtained by a classifier. When a plurality of classifiers having different determination criteria are provided in the analysis unit 22, the plurality of classifier may output different classification results. At this time, while an event type may be determined by a majority logic in which a result output by the most classifiers is adopted, reliability may not be ensured when classification results of the plurality of classifiers vary. Thus, only when classifiers at a higher ratio than the classification threshold (80% in this example) output the same classification result, the analysis unit 22 adopts the result, and when the maximum number of classifiers which have performed classification into each event type is less than or equal to a predetermined threshold, the analysis unit 22 rejects the result. By doing so, it is possible to reject a less reliable determination result, and it is possible to improve the event determination performance.

In the sub-window 310, identifiers of data that are the examined subjects are listed. In this example, a case where feature amounts in a unit of time-series data on a day basis are calculated is assumed, and date when data is measured by the sensor 11 corresponds to an identifier. Thus, in FIG. 7, dates such as "10/01/15" (indicating Jan. 15, 2010) are listed in the vertical direction. Note that, when a shorter period than an hour unit, a minute unit, or the like is one unit, it is desirable to include not only a date but also time in an identifier. Note that an identifier of data displayed in the sub-window 310 can be pressed, and when the identifier is pressed, the display changes to the sensor data display window described later, and corresponding data is displayed.

Figure 8:
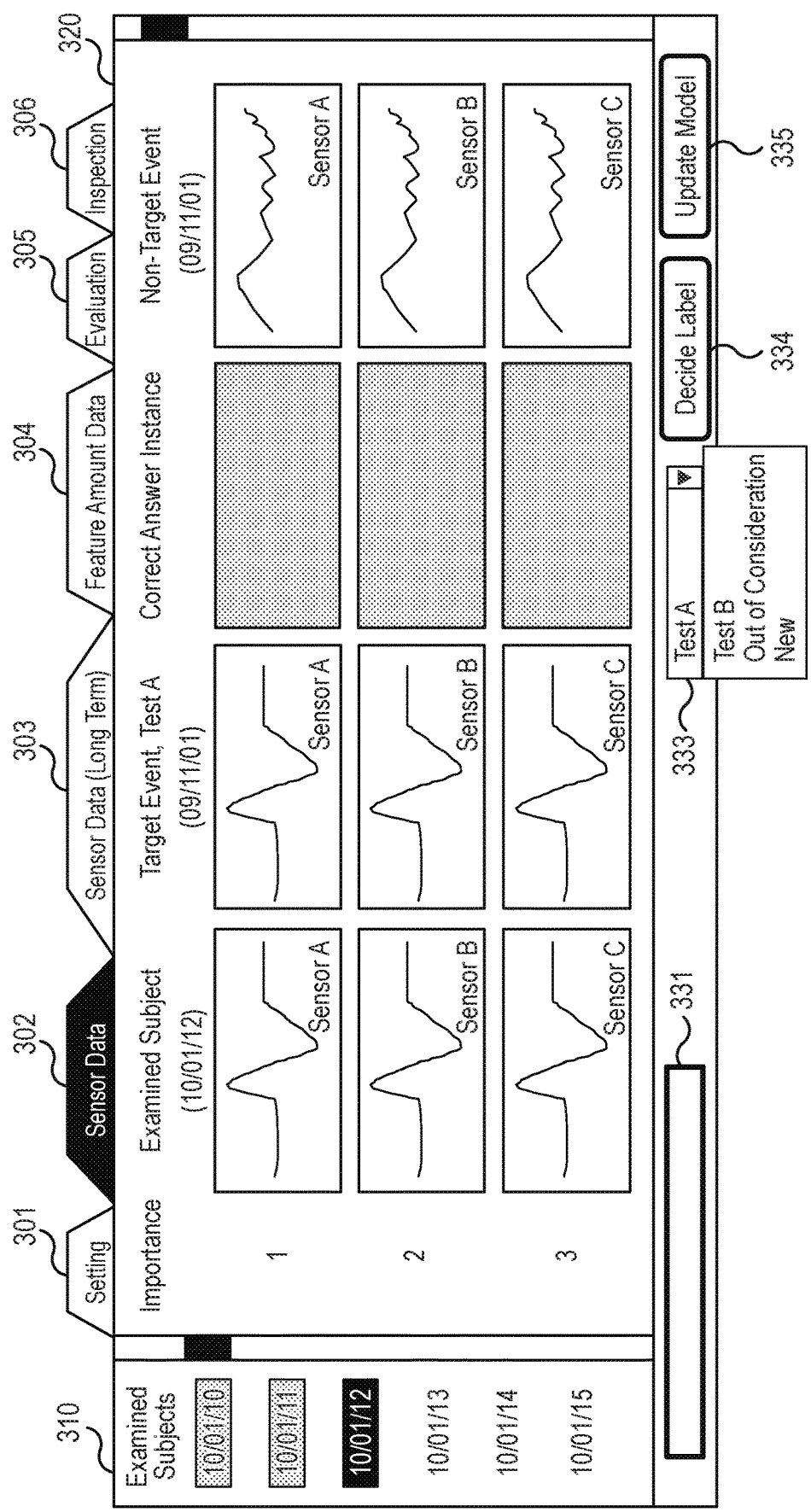
FIG. 8 is a window example used for event type input according to the first example embodiment of the present invention.

FIG. 8 illustrates a display example of the sensor data display window. The tab 302 denoting "Sensor Data" or the identifier of data displayed in the sub-window 310 is pressed, a plurality of sensor data (time-series data) as illustrated in FIG. 8 are displayed in the main window 320. The display of the main window 320 is display corresponding to step S32 of FIG. 5 and is based on the first display information generated by the display information generation unit 241.

In the identifiers displayed in the sub-window 310, identifiers on which association of an event type (denoted as a label in this display window) is already completed are displayed with hatching, and an identifier being displayed in the main window 320 is displayed with black/white inversion.

In the main window 320, time-series data are arranged in a matrix. Time-series data of an examined subject, time-series data of a target event, time-series data of a correct answer instance, and time-series data of a non-target event are aligned in the horizontal direction (first direction). Further, a plurality of time-series data are aligned in order of importance in the vertical direction (second direction). Here, the time-series data of an examined subject is time-series data in which association with an event type is undecided, which is the first time-series data classified as a target event by a classifier in step S31 and thus is time-series data to be examined by the manager. In this example, it is assumed that the time-series data of an examined subject is classified as a target event whose name is "Test A" by a classifier. Such arrangement of time-series data enables the manager to determine at a sight which of the time-series data of a correct answer instance or the time-series data of a non-target event the time-series data of the examined subject is similar to.

The time-series data of a target event is the second time-series data that is already associated with the same target event as a classification result obtained by a classifier (that is, the test A). The time-series data of a correct answer instance will be described later. The time-series data of a non-target event is the third time-series data that is already associated with a non-target event. The importance is a degree of contribution when association is performed in a plurality of time-series data and used for learning. For example, when the random forest is employed for the algorithm of machine learning, a Gini coefficient may be used as an index of importance.

Under the main window 320, a pulldown menu 333 and buttons 334 and 335 are displayed. The pulldown menu 333 is a menu used for guiding the manager to select or input an event type. In this example, the pulldown menu 333 is configured to select any one of items of "Test A", "Test B", "Out of Consideration", and "New". In a default setting, "Test A" that is the same as the classification result of a classifier is displayed in the pulldown menu 333. For example, when the manager determines that the time-series data of an examined subject corresponds to "Test B" that is different event type from "Test A", it is possible to set an event type by selecting "Test B". Further, "Out of Consideration" is an item selected when the manager determines that the time-series data of an examined subject corresponds to data out of consideration for classification, and "New" is an item selected when the manager determines that the time-series data of an examined subject has to be distinguished as different event type from "Test A" and "Test B". When "New" is selected, a window, a textbox, or the like that guides the manager to input an item name may be further displayed.

When the button 334 denoting "Decide Label" is pressed, an event type setting selected by the pulldown menu 333 is decided, and training data is updated. Further, time-series data already associated with the decided event type is displayed in the field of time-series data of a correct answer instance. For example, when "Test B" is selected by the pulldown menu 333, time-series data already associated with the test B is displayed as a correct answer instance. Note that, since FIG. 8 illustrates the window example before a label is decided, no data is displayed in the field of a correct answer instance. Accepting of correct input of an event type by using the pulldown menu 333 and the button 334 corresponds to step S33 of FIG. 5.

When the button 335 denoting "Update Model" is pressed, re-learning on a classifier (denoted as model in this display window) by using updated training data is performed. This re-learning corresponds to step S34 of FIG. 5. Then, classification of time-series data in which association with an event type is undecided is again performed by a re-trained classifier, and the window changes to the setting window. This classification corresponds to step S31 of FIG. 5.

Note that time-series data of a target event, time-series data of a correct answer instance, and time-series data of a non-target event are automatically selected from time-series data included in training data. More specifically, on the column of time-series data of the target event (the second column from the left), time-series data for one period of the same event type as the event type of the examined subject classified by a classifier (test A in FIG. 8) is selected from the training data and displayed. On the column of time-series data of the correct answer instance (the third column from the left), time-series data for one period of the same event type as the event type decided by pressing of the button 334 is selected from the training data and displayed. Note that, before an event type is decided, no time-series data of a correct answer instance is displayed as illustrated in FIG. 8. On the column of time-series data of the non-target event (the fourth column from the left), time-series data for one period of the non-target event is selected from the training data and displayed. At this time, while selection to decide which data to display from many training data may be at random, it is preferable that one having a high similarity to the time-series data of the examined subject on the same row be selected in order to further facilitate examination performed by the manager. An example of the similarity referenced at this selection may be the reciprocal of a Euclid distance between data waveforms or the reciprocal of a dynamic time warping (DTW) distance between data waveforms. Here, while calculation of a similarity may be performed on the acquired data itself, a predetermined process may be performed before the calculation of a similarity. An example of a predetermined process performed before the calculation of a similarity may be a process for normalizing data of each period so that the average becomes 0 and the variance becomes 1.

Figure 9:
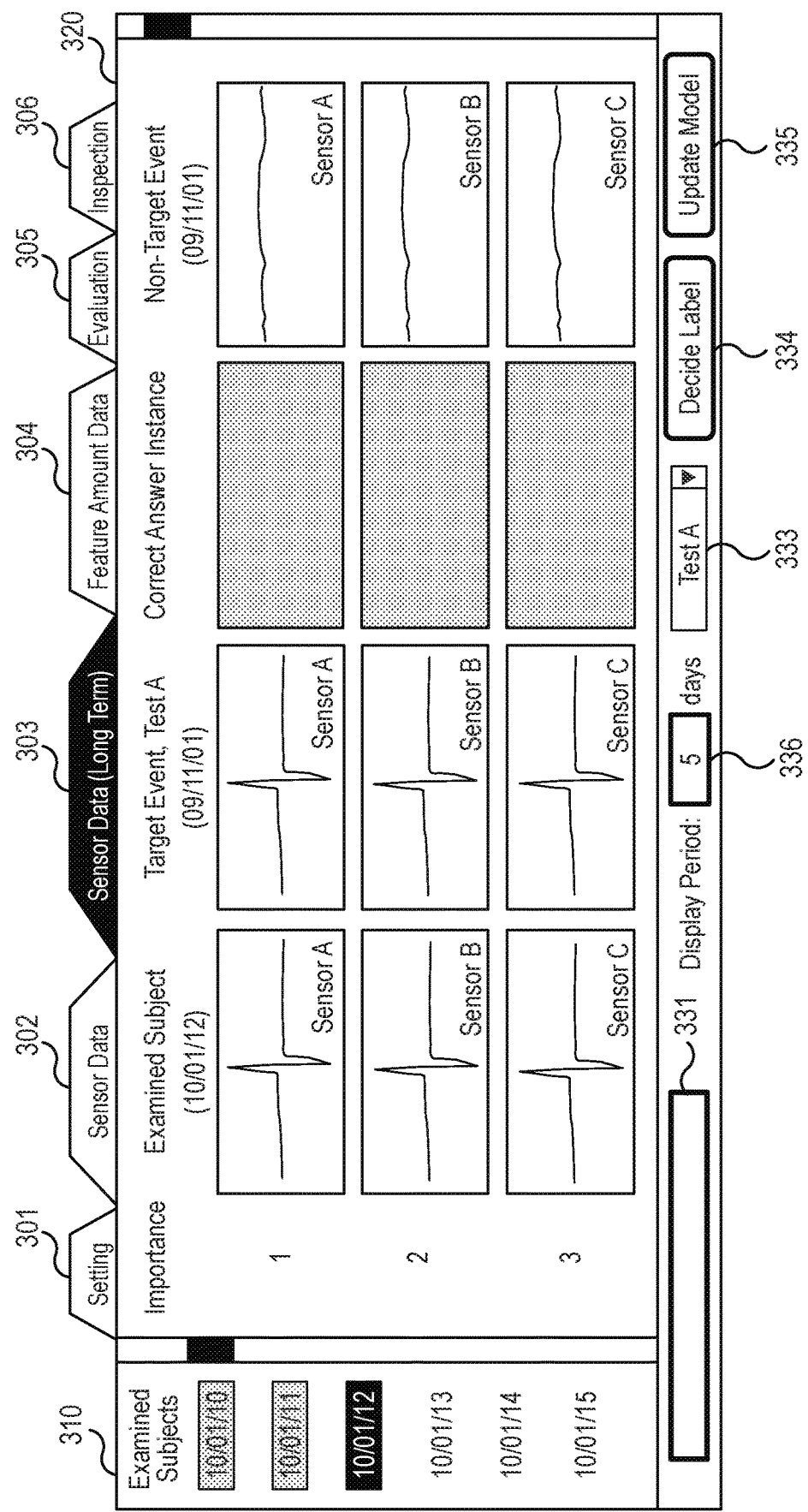
FIG. 9 is a window example used for event type input according to the first example embodiment of the present invention.

FIG. 9 illustrates a display example of a sensor data (long term) display window. When the tab 303 denoting "Sensor Data (Long Term)" is pressed, a plurality of sensor data (time-series data) as illustrated in FIG. 9 are displayed in the main window 320. The difference from FIG. 8 is in that the horizontal axis of the graph of time-series data spans a long term and that the textbox 336 used for input of a display period is displayed under the main window 320. When a desired period is input in the textbox 336, the horizontal axis of each time-series data is re-set, and the graph is updated. Note that the center time of the horizontal axis of the graph is set so as to be the same as the center time of the horizontal axis of the graph in the sensor data display window of FIG. 8. Since other features are the same as those in FIG. 8, the description thereof will be omitted. By further referencing the sensor data (long term) display window of FIG. 9, it is possible to set an event type taking the feature of long term time-series data into consideration.

Figure 10:
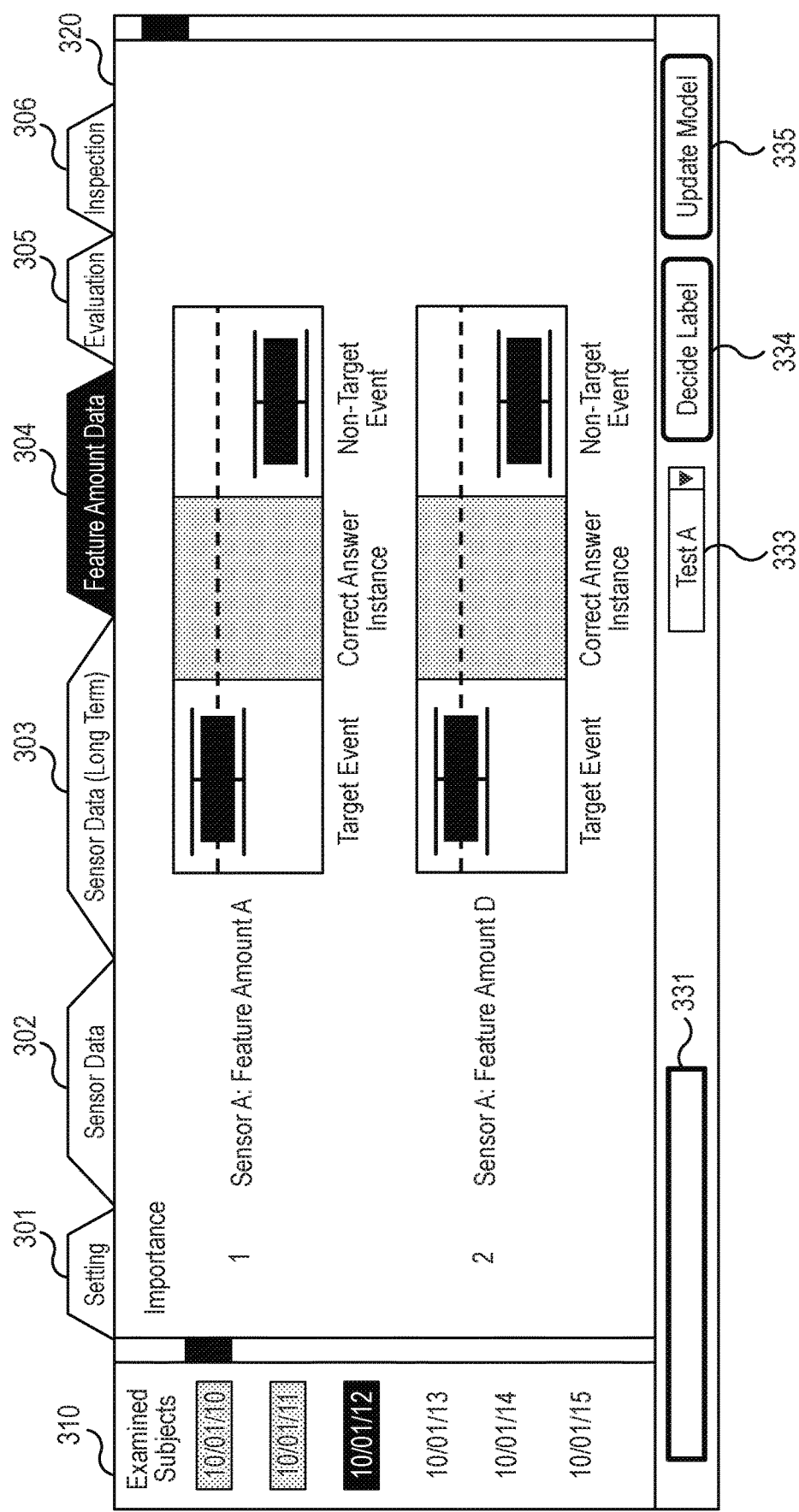
FIG. 10 is a window example used for event type input according to the first example embodiment of the present invention.

FIG. 10 illustrates a display example of a feature amount data display window. When the tab 304 denoting "Feature Amount Data" is pressed, a plurality of feature amounts as illustrated in FIG. 10 are displayed in the main window 320. Boxplots indicating values of the feature amount of time-series data of the target event, the feature amount of the correct answer instance, and the feature amount of the non-target event are arranged in the horizontal direction (first direction). Each dashed line in FIG. 10 indicates a value of a feature calculated from time-series data of the examined subject. Further, respective data are arranged in order of importance in the vertical direction (second direction). The field of the correct answer instance is displayed after the button 334 is pressed and an event type of the examined subject is decided in the same manner as in FIG. 8 and FIG. 9. Since other items are the same as those in FIG. 8 and FIG. 9, the description thereof will be omitted. By further referencing the sensor data (long term) display window of FIG. 10, it is possible to set an event type taking the value of a feature amount into consideration. Note that, while the value of a feature amount is visualized by a boxplot as illustrated in FIG. 10, a display form in which the value of a feature amount itself is displayed in a numerical value may be employed. Such display of a feature amount is based on fourth display information generated by the display information generation unit 241.

Figure 11:
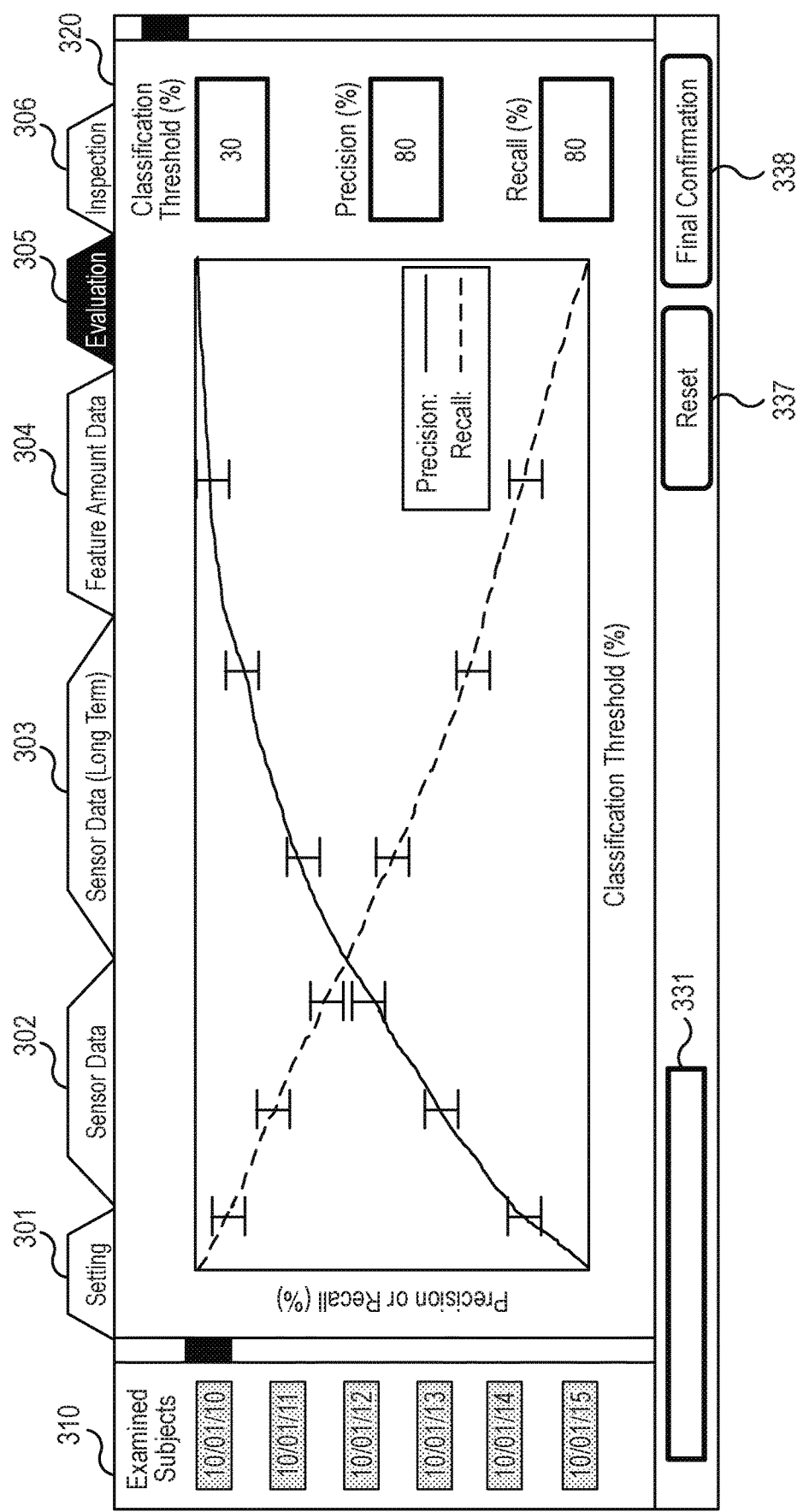
FIG. 11 is a window example used for event type input according to the first example embodiment of the present invention.

FIG. 11 illustrates a display example of an evaluation window. When the tab 305 denoting "Evaluation" is pressed, a graph and textboxes as illustrated in FIG. 11 are displayed in the main window 320. Such display is based on second display information generated by the display information generation unit 241.

The horizontal axis of the graph represents the classification threshold, and the vertical axis represents precision and recall that are the evaluation results of classification. When the classification threshold is increased, the result is adopted only when the matching degree of the output of a classifier is high, and thus the precision increases, however, the probability of rejection also increases, and thus the recall decreases. In such a way, there is a tradeoff relationship between precision and recall. This evaluation window is used for properly determining a classification threshold while examining the tendencies of both evaluation results.

The textbox of "Classification Threshold (%)" accepts input of a classification threshold. This input may be referred to as second input. When a classification threshold is input, precision and recall corresponding to the threshold are automatically displayed in respective textbox. FIG. 11 illustrates that "30" is input as a classification threshold and thereby each value of the precision and the recall is displayed as "80". Note that the default value of the classification threshold is set to a value such that a predetermined performance index such as F-measure is the maximum. The F-measure is a harmonic mean of precision and recall.

Buttons 337 and 338 are displayed under the main window 320. The button 337 will be described later in the description for FIG. 12. When the button 338 denoting "Final Confirmation" is pressed, the value of a classification threshold that is a parameter of a classifier is decided to be the value input in the textbox, and the display of the main window 320 then changes to an inspection window.

Figure 12:
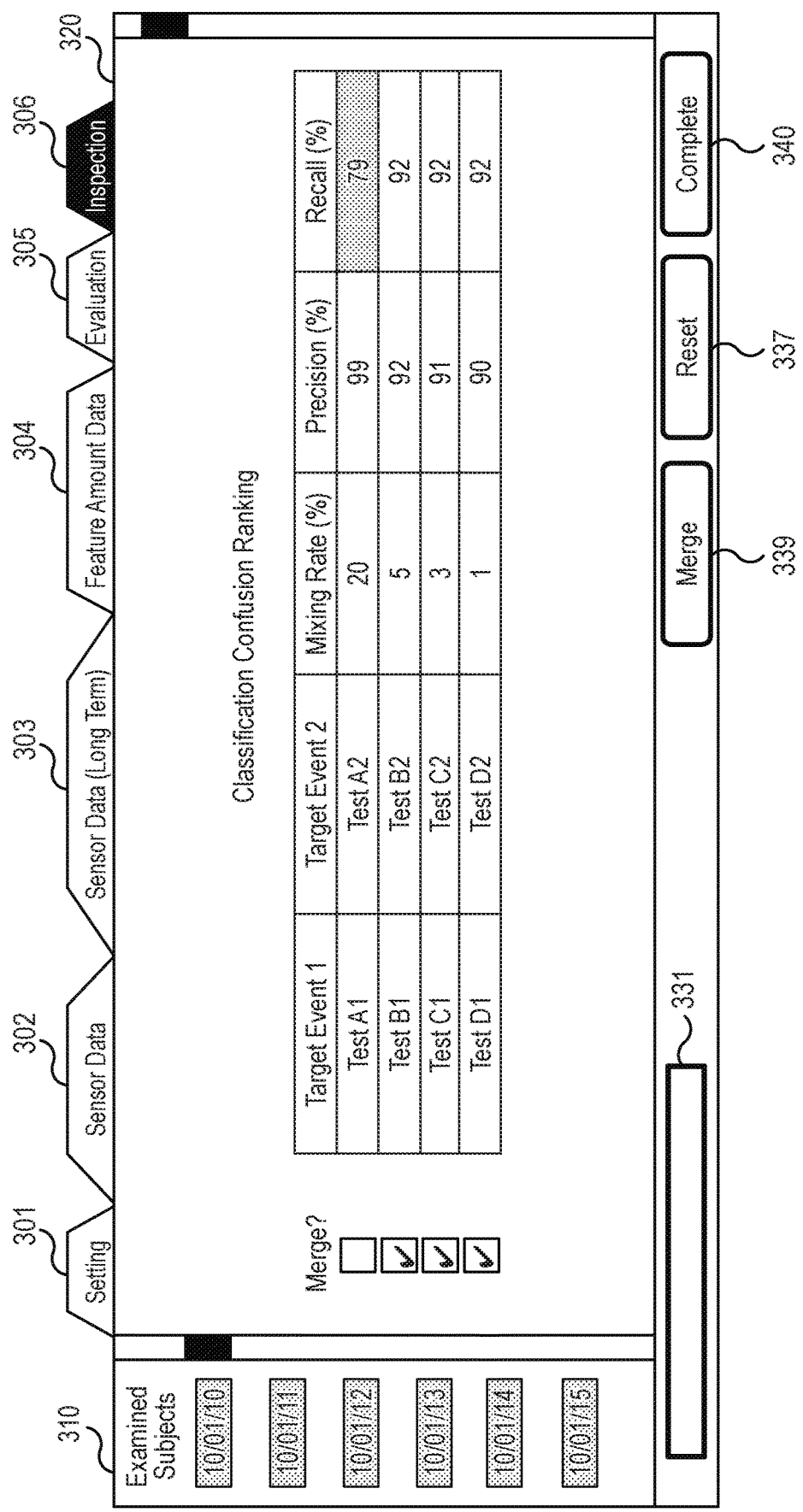
FIG. 12 is a window example used for event type input according to the first example embodiment of the present invention.

FIG. 12 illustrates a display example of an inspection window. When the tab 306 denoting "Inspection" is pressed, a table and checkboxes as illustrated in FIG. 12 are displayed in the main window 320. The table in FIG. 12 indicates the state of confusion in classification of target event 1 and target event 2. For example, the first row indicates that the mixing rate of data having an event type in training data of "Test A1" and data having an event type of "Test A2" is 20%, and the precision and the recall of this classification are 99% and 79%, respectively. This display of the inspection window is based on third display information generated by the display information generation unit 241.

Here, a mixing rate of an X event and a Y event is defined as (the number of times that the X event is erroneously determined as the Y event+the number of times that the Y event is erroneously determined as the X event)/(the number of times that the X event is determined as the X event+the number of times that the Y event is determined as the Y event). There may be no problem in handling an event type having a high mixing rate as the same event type. In such a case, by merging event types having a high mixing rate into a single event type, the event determination performance may be improved.

The checkbox in the field denoting "Merge?" is a field by which merging of a target event (a merger of event types) to be performed is set. Further, buttons 337, 339, and 340 are displayed under the main window 320. When the button 339 denoting "Merge" is pressed in a state where the checkbox of "Merge?" is checked, two target events on the checked rows are merged. The display of the main window 320 then changes to the evaluation window. Note that the input as to whether or not merging is necessary may be referred to as third input.

When the button 337 denoting "Reset" is pressed, a state before merging is performed can be recovered. The button 337 illustrated in FIG. 11 also has the same function. When the button 340 denoting "Complete" is pressed, learning on the classifier ends.

Note that, as the precision and the recall in FIG. 12, values at which the performance index of a classifier such as the F-measure is the maximum are displayed. When being below the value set in the previous evaluation window, each of these values is displayed in a distinguishable state such as the hatched recall on the first row in FIG. 11.

It is not always appropriate to perform merging when the mixing rate is high. For example, when a setting of a target event is inappropriate, it is better to correct the setting of a target event rather than perform merging. In such a case, it is also possible to change the display of the main window 320 to the sensor data display window by pressing an identifier of the sub-window 310 and re-set a target event.

Figure 13:
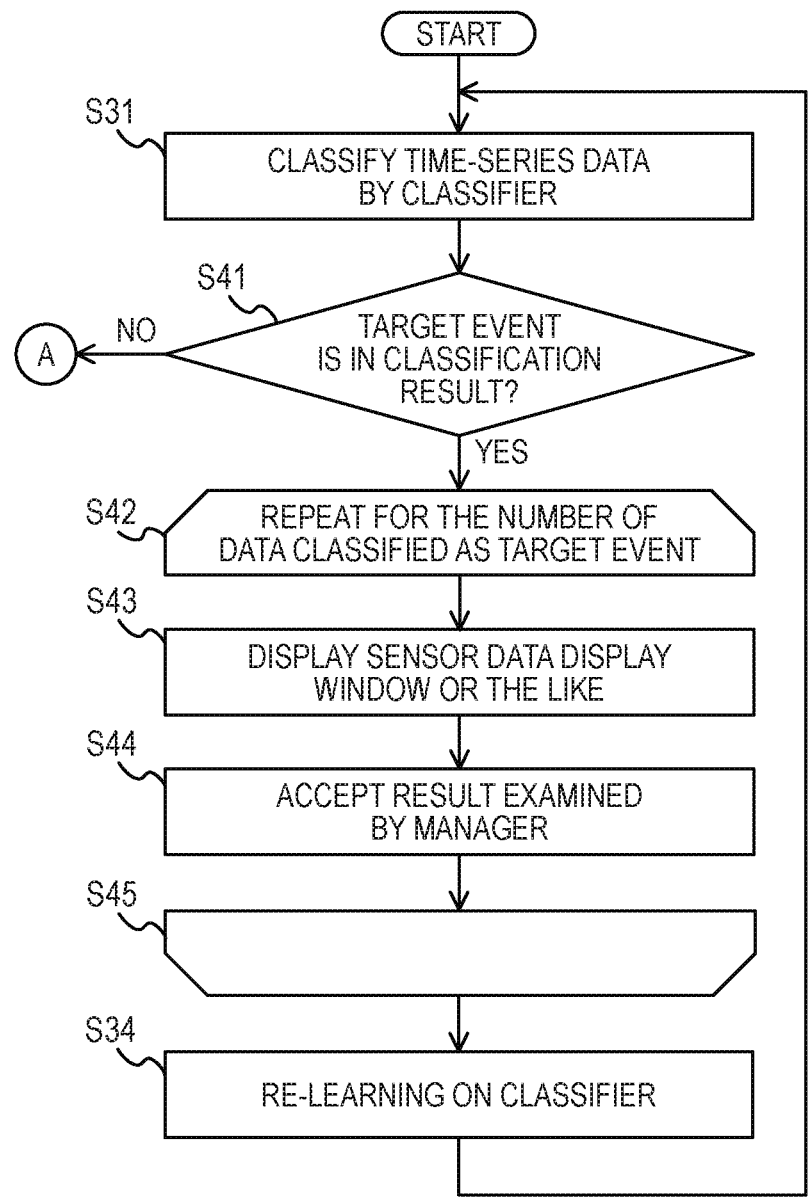
FIG. 13 is a flowchart illustrating an example of event type input method according to the first example embodiment of the present invention.
Figure 14:
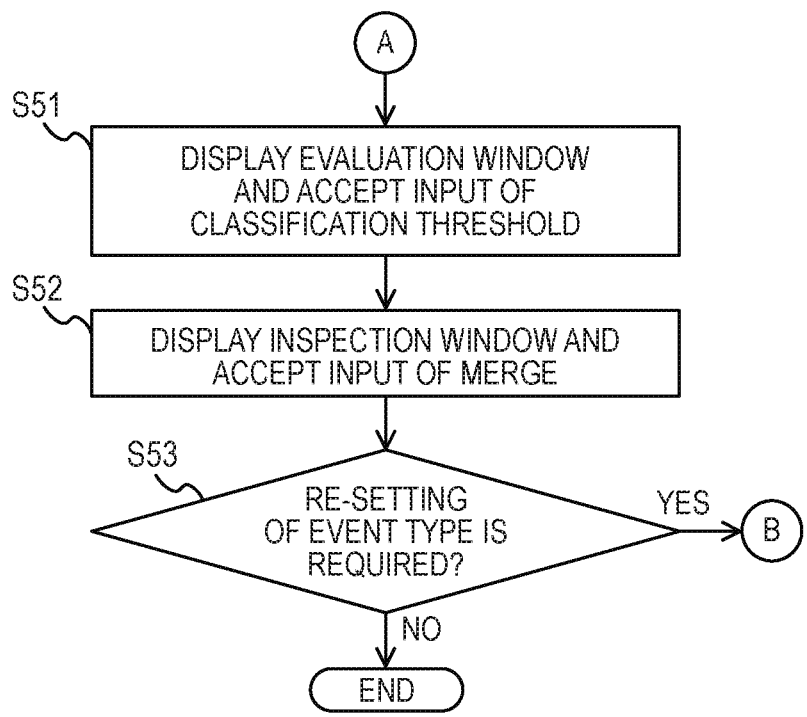
FIG. 14 is a flowchart illustrating an example of event type input method according to the first example embodiment of the present invention.
Figure 15:
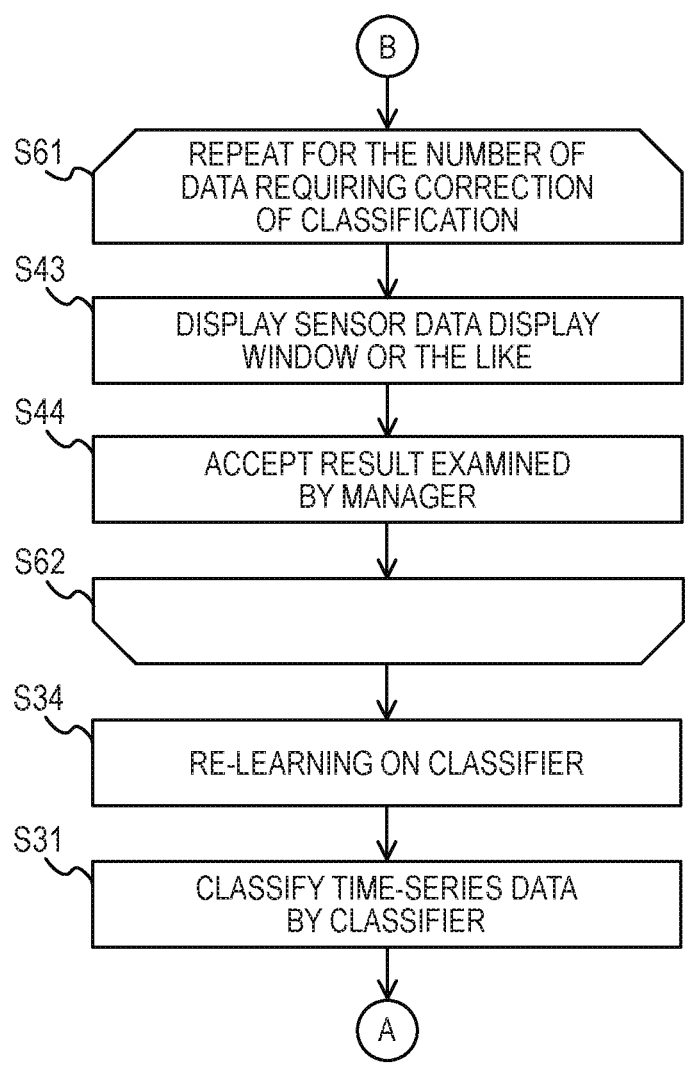
FIG. 15 is a flowchart illustrating an example of event type input method according to the first example embodiment of the present invention.

FIG. 13 to FIG. 15 are flowcharts illustrating an example of an event type input method according to the present example embodiment. This process represents a typical example of an event type input operation by using the GUI of FIG. 6 to FIG. 12. Note that the flowcharts of FIG. 13 to FIG. 15 merely illustrate one example of a procedure that may be performed, and the content and order in the process may be changed if necessary in accordance with order of the user operation, design of the GUI, or the like. The process of FIG. 13 to FIG. 15 will be described while referring also to corresponding window examples of FIG. 6 to FIG. 12.

Since step S31 of FIG. 13 is the same as step S31 of FIG. 5, the description thereof will be omitted. Note that the process of classification by a classifier may be performed in advance before the window display of FIG. 6 to FIG. 12 appears.

In step S41, the event type input unit 24 determines whether or not a classification result classified as a target event is included in classification results obtained by a classifier. If a classification result classified as a target event is included (step S41, YES), the process proceeds to the loop from step S42 to step S45. If no classification result classified as a target event is included (step S41, NO), the process proceeds to step S51 of FIG. 14. Note that the determination in this step may be performed by the manager examining the list of classification and the input unit 242 accepting the result thereof.

The loop from step S42 to step S45 is performed on respective data classified as a target event. In step S43, to cause the manager to examine the classification result obtained by the classifier, the display information generation unit 241 generates display information of the sensor data display window or the like. This display information is displayed on the display 2014. This window display may be the setting window of FIG. 6 and FIG. 7, the sensor data display window of FIG. 8, the sensor data (long term) display window of FIG. 9, or the feature amount data display window of FIG. 10. The manager examines a classification result while appropriately changing the display by an operation such as pressing of the tabs 301, 302, 303, or 304. In step S44, the input unit 242 accepts an input operation performed by the manager, such as correction of a classification result. This input operation may be to input an event type to the pulldown menu 333 or the like.

After the loop from step S42 to step S45, in step S34, the learning unit 21 performs re-learning on a classifier by using training data whose setting of an event type has been examined by the manager. Since this step is the same as step S34 of FIG. 5, the description thereof will be omitted. The process then proceeds to step S31 again.

In step S51 of FIG. 14, the display information generation unit 241 generates display information of the evaluation window of FIG. 11 in order to guide the manager to input a classification threshold. This display information is displayed on the display 2014. The input unit 242 accepts an input operation of a classification threshold performed by the manager.

In step S52, the display information generation unit 241 generates display information of the inspection window of FIG. 12 in order to guide the manager to input whether or not merging is necessary and what are merged. This display information is displayed on the display 2014. The input unit 242 accepts an input operation of merging performed by the manager.

In step S53, if the manager determines that re-setting of an event type is necessary (step S53, YES), the process proceeds to the loop from step S61 to step S62 of FIG. 15 in response to an operation to the change to the sensor data display window or the like being performed. If the manager determines that re-setting of an event type is unnecessary and presses the button 340 denoting "Complete" in FIG. 12 (step S53, YES), the process ends.

The loop from step S61 to step S62 is performed on respective data requiring re-setting of an event type. Since step S43 and step S44 included in the loop from step S61 to step S62 are the same as those described above, the description thereof will be omitted.

After the loop from step S61 to step S62, the operations of step S34 and step S31 are performed. Since these operations are the same as those of step S31 and step S34 of FIG. 5, the description thereof will be omitted. The process then proceeds to step S51 of FIG. 14 again.

The advantage of the present example embodiment will be described. While a large number of time-series data are obtained by the sensor 11 in the present example embodiment, such a GUI that makes it possible to perform association of event types with a small burden in a situation where the number of time-series data with which event types are associated is small is provided. In the present example embodiment, classification may be performed by using a classifier trained by a small number of learning data, and the manager may correct only necessary classification while referencing the classification result. Thus, a man-hour for examining and associating time-series data can be reduced compared to a case where a large number of data are examined, event types are associated, and a large number of learning data are prepared from the beginning.

Further, when the number of time-series data with which event types are associated is small, it is often unclear what setting of an event type is appropriate. To address this, in the present example embodiment, it is possible to arrange and display time-series data of a target event and a non-target event in the time-series data of an examined subject. Accordingly, the manager is able to more visually perform association work and thus efficiently perform the association by using a method of determining which of the target event or the non-target event the feature of the examined subject is similar to or the like.

For the reasons described above, according to the present example embodiment, an analysis system, an analysis method, and a storage medium that can reduce a management burden can be provided.

Second Example Embodiment

One example of the configuration of the learning unit 21 and the analysis unit 22 that may be applied in implementing the present invention will be described as a second example embodiment. Since other configurations are the same as those of the first example embodiment, detailed description thereof will be omitted.

Figure 16:
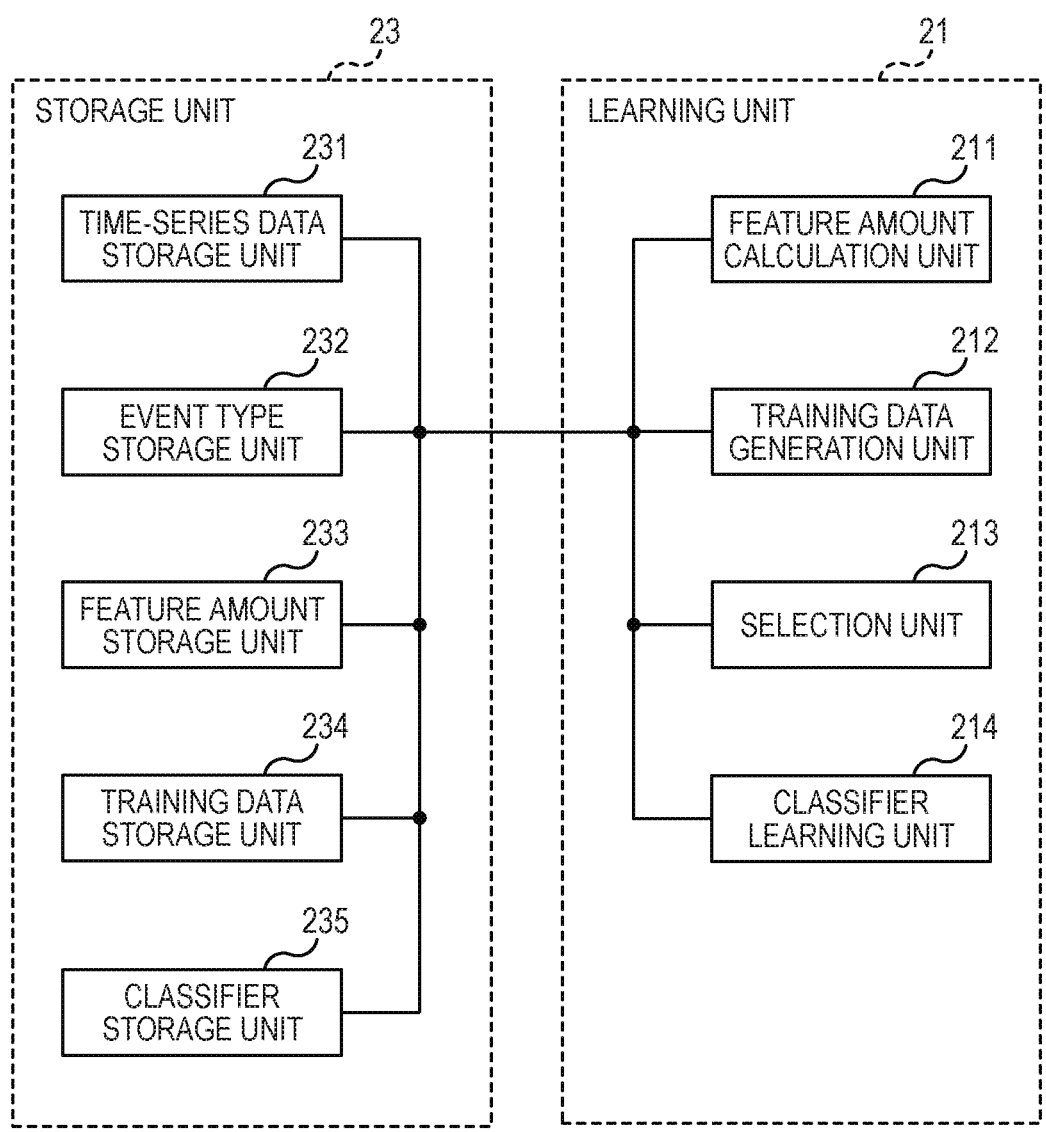
FIG. 16 is a block diagram illustrating a function configuration of a learning unit and a storage unit according to a second example embodiment of the present invention.
Figure 17:
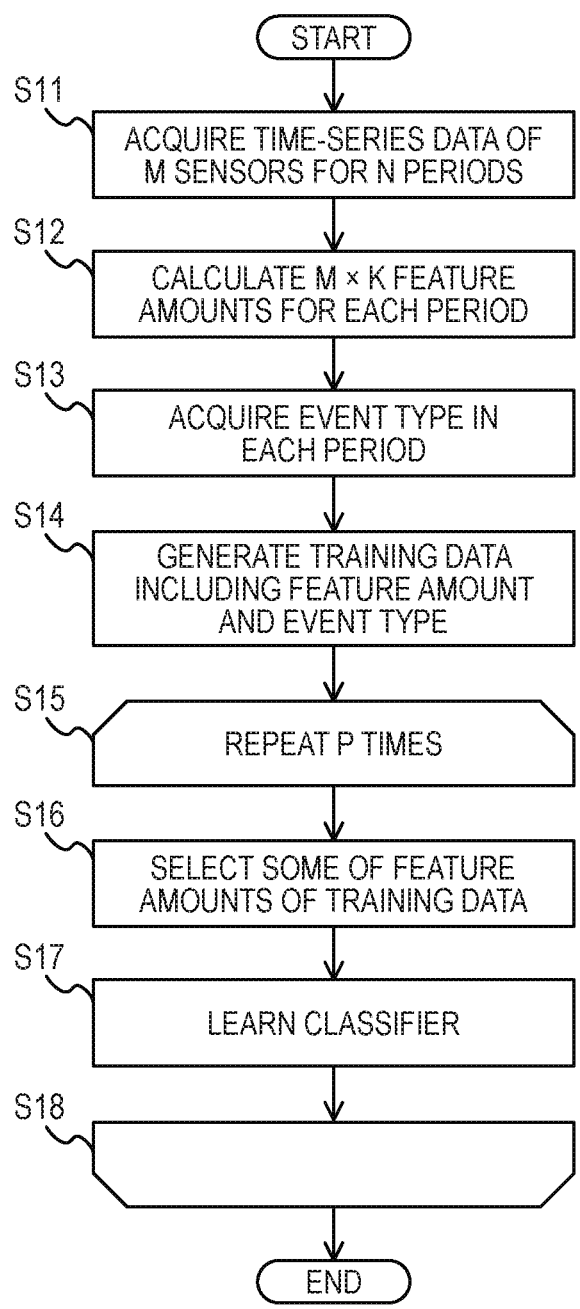
FIG. 17 is a flowchart illustrating a learning operation of a classifier according to the second example embodiment of the present invention.
Figure 18:
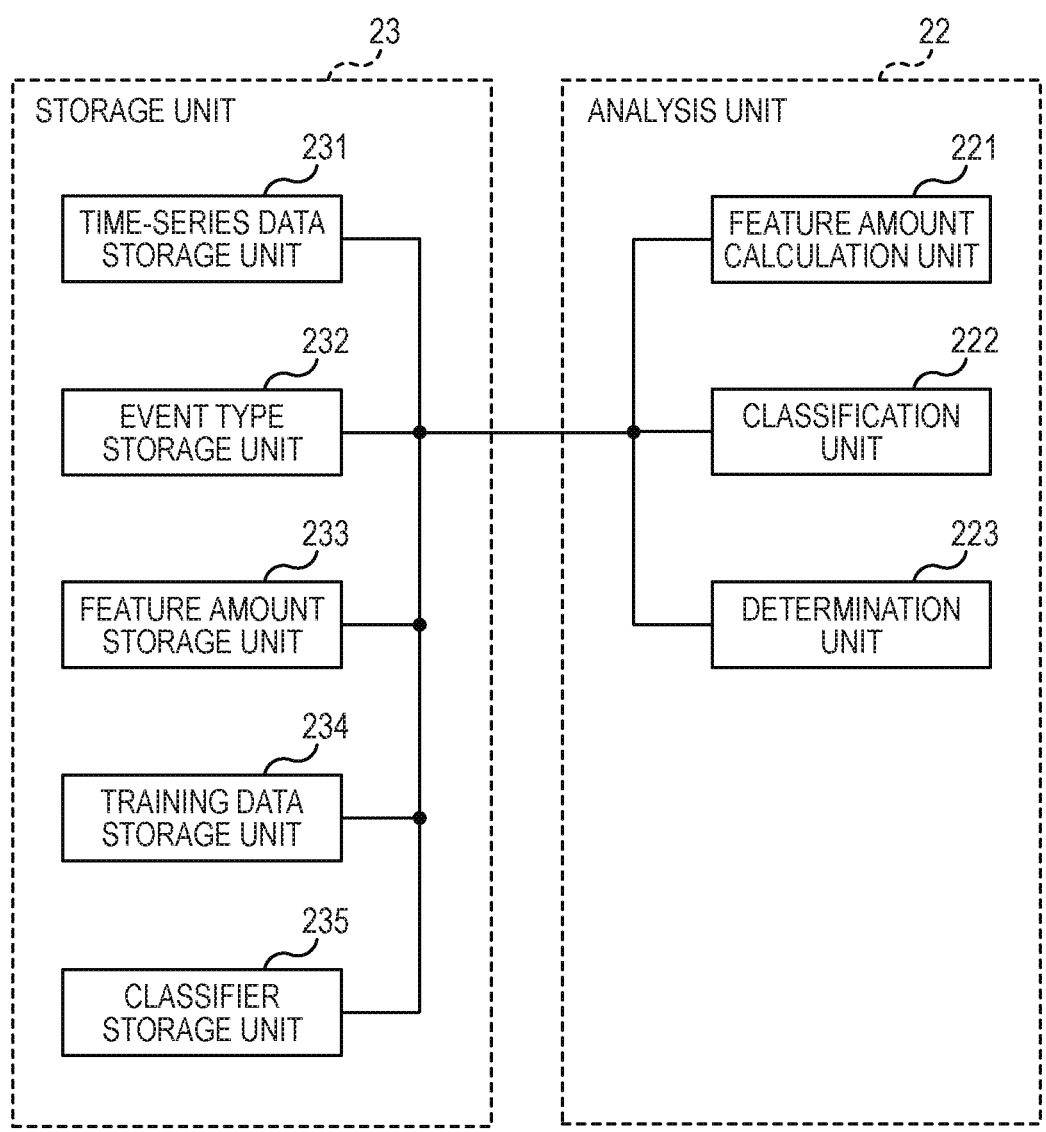
FIG. 18 is a block diagram illustrating a function configuration of an analysis unit and the storage unit according to the second example embodiment of the present invention.
Figure 19:
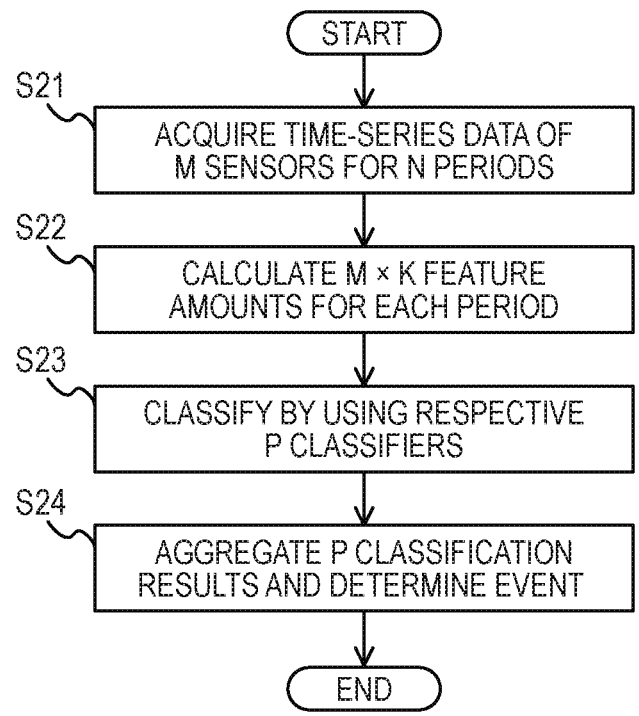
FIG. 19 is a flowchart illustrating an event determination operation according to the second example embodiment of the present invention.

Next, with cross reference to FIG. 16 to FIG. 19, learning on a classifier and determination of an event in the present example embodiment will be described. FIG. 16 is a block diagram illustrating a function configuration of the learning unit 21 and the storage unit 23 according to the present example embodiment. FIG. 17 is a flowchart illustrating a learning operation on a classifier according to the present example embodiment. FIG. 18 is a function block diagram of the analysis unit 22 and the storage unit 23 according to the present example embodiment. FIG. 19 is a flowchart illustrating an event determination operation according to the present example embodiment.

The learning operation on a classifier according to the present example embodiment will be described with reference to FIG. 16 and FIG. 17. As illustrated in FIG. 16, the learning unit 21 has a feature amount calculation unit 211, a training data generation unit 212, a selection unit 213, and a classifier learning unit 214. Since configurations of the storage unit 23 are the same as those of FIG. 3, detailed description thereof will be omitted.

In step S11 of FIG. 17, the analysis system 2 acquires time-series data output from the plurality of sensors 11 and stores the acquired time-series data in the time-series data storage unit 231. Note that the operation of step S11 may be performed in advance with such a scheme that performs the operation in real-time at the time of measurement by the sensor 11, for example.

In step S12, the feature amount calculation unit 211 reads time-series data stored in the time-series data storage unit 231 and calculates one or a plurality of feature amounts. The calculated feature amounts are stored in the feature amount storage unit 233.

In step S13, the event type input unit 24 of the analysis system 2 accepts input of an event type corresponding to each period. The input event type is stored in the event type storage unit 232.

In step S14, the training data generation unit 212 generates data in which feature amounts stored in the feature amount storage unit 233 and event types stored in the event type storage unit 232 are associated based on respective time or periods. Such data is used as training data for supervised machine learning on a classifier. The generated training data is stored in the training data storage unit 234.

Then, the loop from step S15 to step S18 is repeated for P times (P is an integer not less than two). In step S16, the selection unit 213 classifies, out of training data stored in the training data storage unit 234, data of the M sensors 11 in the N periods, that is, Z=N×M data for each event type and selects a feature amount group corresponding to some or all of the periods for respective event types. For example, when three types, namely, the target event A, the target event B, and the non-target event X are present, selection is performed on each of the target event A, the target event B, and the non-target event X. Here, when a plurality of feature amounts are calculated for one of the Z=N×M data in step S12 (when K is plural), K feature amounts are selected to be included in a feature amount group as a set. In such a way, the feature amount group selected in this step includes N1×M×K feature amounts calculated for respective K feature amounts from the data of the M sensors obtained in some or all periods of the N periods (the number of these periods is denoted as N1).

In step S17, the classifier learning unit 214 uses the data of the feature amount group selected in step S16 to perform learning on the classifier. Here, the learning performed by the classifier learning unit 214 is the supervised machine learning. More specifically, such supervised machine learning that determines a feature amount in training data as data required for estimating classification and determines an event type as a correct answer (supervisor) to be estimated based on the feature amount is performed. A scheme used for the supervised machine learning may be, for example, a support vector machine, a random forest, a neural network, or the like.

Learning on one classifier is performed by step S16 and step S17. The trained classifier is stored in the classifier storage unit 235. The operations of step S16 and step S17 described above are repeated for P times, and learning on the P classifiers is performed. Here, in each of P times of step S16, selection is performed so that combinations of data included in a feature amount group to be selected are different from each other. Accordingly, the P classifiers to be generated are trained based on feature amount groups which are different from each other and thus serve as classifiers which are of the same type but have different classification criteria from each other.

The loop from step S15 to step S18 is repeated for P times, and upon completion of learning on the P classifiers, the learning operation on classifiers in accordance with the flowchart of FIG. 17 ends.

Next, the event determination operation according to the present example embodiment will be described with reference to FIG. 18 and FIG. 19. This operation is an operation to use the P classifiers obtained by the learning operation described above to determine an event that occurred in the plant 1 based on time-series data of the sensor 11. As illustrated in FIG. 18, the analysis unit 22 has a feature amount calculation unit 221, a classification unit 222, and a determination unit 223. Since the configuration of the storage unit 23 is the same as that of FIG. 3, the description thereof will be omitted.

In step S21 of FIG. 18, the analysis system 2 acquires time-series data output from the plurality of sensors 11 and stores the acquired time-series data in the time-series data storage unit 231. Note that the operation of step S21 may be performed in advance with such a scheme that performs the operation in real-time at the time of measurement by the sensor 11, for example. Note that the combination of the plurality of sensors 11 that acquire time-series data is the same as the combination of the plurality of sensors 11 used for generating training data described above.

In step S22, the feature amount calculation unit 221 reads time-series data stored in the time-series data storage unit 231 and calculates one or a plurality of feature amounts. Here, the type, the number, and the like of the feature amount to be calculated are the same as those of the training data described above. Since this process is the same as step S12 of FIG. 17, detailed description thereof will be omitted.

In step S23, the classification unit 222 uses each of the P classifiers stored in the classifier storage unit 235 to perform classification of event types in which feature amounts for respective periods stored in the feature amount storage unit 233 are input data. In response to input, each classifier outputs a result in which an event type is classified into event classification of either the target event or the non-target event defined at the time of learning.

In step S24, the determination unit 223 aggregates P event classification results respectively output by the P classifiers and determines an event that occurred in the plant 1 in each period. The P classifiers have different classification criteria and thus may output different classification results. Accordingly, to obtain one determination result, the P event classification results are aggregated at the time of determination to perform the determination. This determination is performed by majority logic that determines that an event corresponding to an event type classified by the most classifiers occurred in a classification target period, for example. However, the event determination result is rejected if the maximum value is less than or equal to a predetermined threshold.

More specifically, an algorithm described below may be employed. If the maximum value of the number of classifiers that have performed classification into each event type is larger than a predetermined threshold, the determination unit 223 determines that an event corresponding to an event type classified by the most classifiers occurred in a classification target period. If the maximum value of the number of classifiers that have performed classification into each event type is smaller than or equal to a predetermined threshold, the determination unit 223 determines that no target event occurred in a classification target period. By doing so, it is possible to reject a less reliable determination result, and it is thus possible to improve the event determination performance.

In such a way, the analysis system 2 of the present example embodiment can determine an event that occurred in the plant 1 for each predetermined period based on time-series data obtained by the plurality of sensors 11. The analysis system 2 may store the event determination result as a log or may notify the manager of a message in accordance with the event determination result. The message in accordance with an event determination result may be display of a warning text on the display 2014, a notification by a sound, a light, or the like from an alert device (not illustrated), or the like.

The advantage of the present example embodiment will be described. In general, since the normal operation is an abstract concept, a large burden is required for defining a determination criterion used for determining whether or not operation is normal operation and inputting information indicating that the operation is normal operation. In contrast, in the operation of the analysis system 2 of the present example embodiment, the manager has only to input occurrence time of a target event and is not required to input information on normal operation, because normal operation is handled as a non-target event even when the time thereof is not input in particular. Further, similarly, an event that does not need to be classified can be handled as a non-target event even without input in particular. Therefore, the analysis system 2 of the present example embodiment can reduce information which has to be input by the manager and can reduce a management burden.

Since events other than the target event are handled as a non-target event as a whole without definition of normal operation, an event may not be correctly classified in some of the P classifiers for some learning status. However, the learning system of the present example embodiment can reduce influence of erroneous classification of some of the classifiers by using a plurality of classifiers having criteria different from each other to perform classification and aggregating the results thereof. Thus, the analysis system 2 as a whole can ensure sufficient determination performance.

Further, in the analysis system 2 of the present example embodiment, even when the number of event types to be classified increases or the like, the workload of the manager when update is needed is small. In the present example embodiment, since the classifier trained by the supervised machine learning is used, when the number of event types to be classified increases, the manager has only to update training data by inputting the event type and the occurrence time range after the increase and perform re-learning on the classifier. Therefore, no large management burden such as repair of the system or reconfiguration of the database is caused. Furthermore, no large management burden is required because it is not necessary to request additional work from the plant 1 side at the time of analysis.

As described above, according to the present example embodiment, a learning system, an analysis system, a learning method, and a storage medium that can reduce a management burden can be provided.

Note that, while the selection scheme of data in step S16 is not limited, it is desirable that selection be performed at random by using a randomized algorithm or the like so that different data are more reliably selected through P times of loop.

Further, in the selection in step S16, it is desirable to select a more number of feature amounts associated with a non-target event than the number of feature amounts associated with a target event from a feature amount group used for learning on one classifier. This is because, since a non-target event includes various behavior events, a large number of data will be required in order to perform sufficient learning.

Further, in the selection in step S16, it is desirable to select all the feature amounts associated with a target event and select some of the feature amounts associated with a non-target event with respect to the feature amounts used for learning on one classifier. Some of the target events occur less frequently. It may often be preferable to select all the target events having explicit classification in order to improve the performance of a classifier. On the other hand, since many data having various features are obtained for a non-target event, selecting all the non-target events may conversely reduce the performance of a plurality of classifiers as a whole, and it may be often preferable to select some of the non-target events. Note that, when selecting some of the feature amounts associated with a non-target event, it is desirable that the selection be performed at random by using a randomized algorithm or the like as described above.

Further, it is desirable for the feature amounts calculated in steps S12 and S22 to include at least the variance of time-series data in a predetermined period. This is because, when an important event occurs in the plant 1, temporal fluctuation of the measurement value measured by the sensor 11 is likely to be large, and characteristic behavior often appears in the variance in particular in various statistics.

Further, it is desirable that the calculation of feature amounts in steps S12 and S22 be performed based on time-series data corresponding to only at least one of the occurrence time and the end time of a target event. The measurement value measured by the sensor 11 may often fluctuate much at the occurrence time and the end time of a target event, and the fluctuation of the measurement value measured by the sensor 11 may often be not large during a period between the occurrence time and the end time. Thus, it is possible to perform more effective learning by using feature amounts obtained based on only at least one of the occurrence time and the end time indicating characteristic behavior to perform learning.

Further, while time-series data illustrated in FIG. 4 may be partitioned in any scheme, it is desirable that time-series data be partitioned by using periods that can divide a day into equal intervals in terms of easiness in application of the scheme. For example, a day is divided equally into 48 by sequentially setting periods at 30-minute intervals such that the period T1 is set to 0:00 to 0:30, the period T2 is set to 0:30 to 1:00, and so on. An event planned in advance such as inspection or the like in the plant 1 is often performed regularly at the same time every day and is often set at a regular hour such as at 2:00, at 4:30, or the like in terms of scheduling of work. To support such occurrence time of an event, it is desirable to partition periods which equally divide a day.

Further, in the selection in step S16, it is desirable to select, out of a set of feature amounts used for learning on one classifier, feature amounts associated with the non-target event in such a combination that includes all the feature amounts that are based on continuous time-series data for at least one day. The continuous time-series data of a day is typically time-series data for one day that starts from 0:00 on a day but may be time-series data that spans two days, such as from 18:00 on a day to 18:00 on the next day, as long as it is time-series data of continuous 24 hours. By selecting all the data of a day collectively, it is possible to reduce a likelihood of missing a feature of a non-target event occurring at predetermined time in a day or a non-target event occurring less frequently such as once a day, and it is thus possible to improve the performance of a classifier. For example, when inspection of a facility is planned at 4:00 every day in the plant 1, if selection excluding a period including 4:00 is made, the feature of this inspection of the facility will be missed. In contrast, with collective selection of data for a day, since inspection performed at 4:00 every day is not excluded, which can eliminate missing of this inspection.

Further, it is desirable that partitioning of predetermined periods in step S11 and partitioning of predetermined periods in step S21 be made in accordance with the same criterion. For example, when the partitioning of predetermined periods in step S11 is to divide a day equally into 48, it is desirable that the partitioning of predetermined periods in step S21 be to divide a day equally into 48 in the same manner. By applying the same way of partitioning periods to both the time of learning and the time of analysis, input data at the time of analysis becomes closer to input data at the time of learning, and it is therefore possible to improve the performance of a classifier.

Third Example Embodiment

Figure 20:
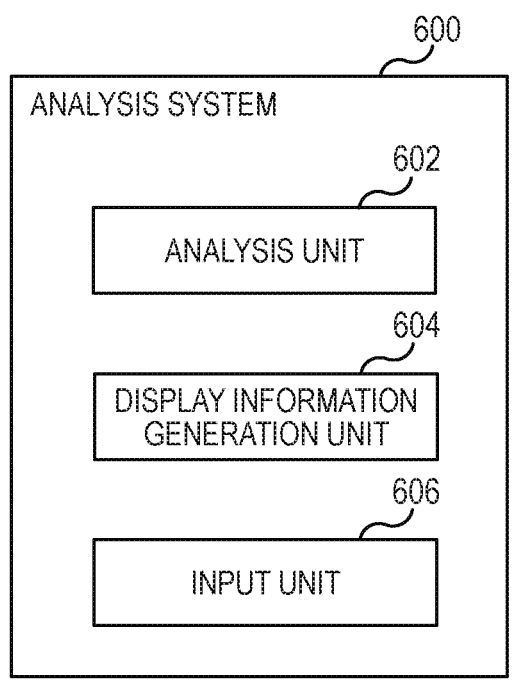
FIG. 20 is a block diagram illustrating a function configuration of an analysis system according to a third example embodiment of the present invention.

The analysis system 2 described above in the first example embodiment and the second example embodiment can also be configured as an analysis system 600 as illustrated in FIG. 20 according to the third example embodiment. FIG. 20 is a block diagram illustrating a function configuration of the analysis system 600 according to the third example embodiment.

As illustrated in FIG. 20, the analysis system 600 according to the third example embodiment has an analysis unit 602 including a classifier that performs classification of an event type on input time-series data. Further, the analysis system 600 has a display information generation unit 604 that generates first display information used for displaying, out of the time-series data, first time-series data in which association of the event type is undecided and which is classified by the classifier as a first event type corresponding to a state where a target event is occurring, second time-series data associated with the first event type, and third time-series data associated with a second event type corresponding to a state where the target event is not occurring. Further, the analysis system 600 has an input unit 606 that accepts first input regarding association of an event type with the first time-series data. Accordingly, the analysis system 600 that can reduce a management burden is provided.

Modified Example Embodiment

While the present invention has been described above with reference to the example embodiments, the present invention is not limited to the example embodiments described above. Various modifications that can be understood by those skilled in the art can be made to the configuration and details of the present invention within the scope not departing from the spirit of the invention of the present application. For example, an example embodiment in which a part of the configuration of any of the example embodiments is added to another example embodiment or an example embodiment in which a part of the configuration of any of the example embodiments is replaced with a part of the configuration of another example embodiment is to be considered to be an example embodiment to which the present invention can be applied.

For example, in the example embodiments described above, time-series data may be a control signal of a device instead of an output value from the sensor 11. In such a case, the control signal may not be an analog signal as illustrated in FIG. 4 and may be a binary digital value, for example. In such a way, the present invention may also be applied to monitoring for control of a device.

The scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disk-read only memory (CD-ROM), a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

Further, a service implemented by the function of each of the example embodiments described above may be provided to a user in a form of Software as a Service (SaaS).

The whole or part of the example embodiments disclosed above can be described as, but not limited to, the following supplementary notes.

(Supplementary Note 1)

An analysis system comprising:

an analysis unit including a classifier that performs classification of an event type on input time-series data;

a display information generation unit that generates first display information used for displaying, out of the time-series data, first time-series data in which association of the event type is undecided and which is classified by the classifier as a first event type corresponding to a state where a target event is occurring, second time-series data associated with the first event type, and third time-series data associated with a second event type corresponding to a state where the target event is not occurring; and an input unit that accepts first input regarding association of the event type with the first time-series data.

(Supplementary Note 2)

The analysis system according to supplementary note 1 further comprising a learning unit that performs learning on the classifier by using, as training data, the first time-series data to which association of the event type is input by the input unit.

(Supplementary Note 3)

The analysis system according to supplementary note 1 or 2, wherein the display information generation unit further generates second display information used for displaying an evaluation result of classification performed by the classifier.

(Supplementary Note 4)

The analysis system according to supplementary note 3, wherein the evaluation result includes precision and recall.

(Supplementary Note 5)

The analysis system according to supplementary note 3 or 4, wherein the analysis unit performs determination of the event type based on a classification result of the classifier, and wherein the input unit further accepts second input regarding a condition of determination of the event type.

(Supplementary Note 6)

The analysis system according to any one of supplementary notes 1 to 5, wherein the display information generation unit further generates third display information used for displaying a state of confusion of a plurality of event types in classification performed by the classifier.

(Supplementary Note 7)

The analysis system according to supplementary note 6, wherein the input unit further accepts third input regarding whether or not a merger of the plurality of event types is necessary.

(Supplementary Note 8)

The analysis system according to any one of supplementary notes 1 to 7, wherein the display information generation unit generates the first display information so that the first time-series data, the second time-series data, and the third time-series data are displayed so as to be arranged in a first direction.

(Supplementary Note 9)

The analysis system according to any one of supplementary notes 1 to 8, wherein the display information generation unit generates the first display information so that each of a plurality of the first time-series data, a plurality of the second time-series data, and a plurality of the third time-series data are displayed so as to be arranged in a second direction.

(Supplementary Note 10)

The analysis system according to supplementary note 9, wherein the plurality of first time-series data that are displayed so as to be arranged in the second direction are aligned in order of importance in learning on the classifier.

(Supplementary Note 11)

The analysis system according to any one of supplementary notes 1 to 10, wherein the display information generation unit generates fourth display information used for performing display based on a feature amount of the first time-series data, a feature amount of the second time-series data, and a feature amount of the third time-series data.

(Supplementary Note 12)

An analysis method comprising:

performing classification of an event type on input time-series data;

generating first display information used for displaying, out of the time-series data, first time-series data in which association of an event type is undecided and which is classified as a first event type corresponding to a state where a target event is occurring, second time-series data associated with the first event type, and third time-series data associated with a second event type corresponding to a state where the target event is not occurring; and accepting first input regarding association of an event type with the first time-series data.

(Supplementary Note 13)

A storage medium storing a program that causes a computer to perform:

performing classification of an event type on input time-series data;

generating first display information used for displaying, out of the time-series data, first time-series data in which association of an event type is undecided and which is classified as a first event type corresponding to a state where a target event is occurring, second time-series data associated with the first event type, and third time-series data associated with a second event type corresponding to a state where the target event is not occurring; and accepting first input regarding association of an event type with the first time-series data.

REFERENCE SIGNS LIST 1 plant
2, 600 analysis system
11 sensor
12 time acquisition unit
21 learning unit
22, 602 analysis unit
23 storage unit
24 event type input unit
211, 221 feature amount calculation unit
212 training data generation unit
213 selection unit
214 classifier learning unit
222 classification unit
223 determination unit
231 time-series data storage unit
232 event type storage unit
233 feature amount storage unit
234 training data storage unit
235 classifier storage unit
241, 604 display information generation unit
242, 606 input unit
301 to 306 tab
310 sub-window
311, 321 knob
331 progress bar
332, 334, 335, 337 to 340 button
333 pulldown menu
336 textbox
2002 CPU
2004 ROM
2006 RAM
2008 HDD
2010 communication I/F
2012 display controller
2014 display
2016 input device
2018 bus line

The invention claimed is:

1. An analysis system comprising:
at least one memory storing instructions; and
at least one processor configured to execute the instructions to:
perform classification of an event type on time-series data that has been input, by using a classifier;
generate first display information for displaying first time-series data that is a part of the input time-series data and has been classified by the classifier as a first event type corresponding to a first state in which a target event is occurring, second time-series data associated in advance with the first event type, and third time-series data associated in advance with a second event type corresponding to a second state in which the target event is not occurring;
display the first display information; and
accept, from a user, first input regarding association of the event type with the first time-series data, wherein the first display information is generated so that:
each of a plurality of the first time-series data, a plurality of the second time-series data, and a plurality of the third time-series data are arranged in a second direction when displayed, and the plurality of first time-series data are further ordered in importance in training of the classifier when displayed, and wherein the importance is a degree of contribution when the association of the event type with the first time-series data is performed for each of the plurality of the first time-series data, and the importance is used for the training of the classifier.

2. The analysis system according to claim 1, wherein the at least one processor is further configured to execute the instructions to perform training of the classifier by using, as training data, the first time-series data with which the association of the event type has been input.

3. The analysis system according to claim 1, wherein the at least one processor is further configured to execute the instructions to generate second display information for displaying an evaluation result of classification performed by the classifier, and to display the second display information.

4. The analysis system according to claim 3, wherein the evaluation result includes precision of the classification performed by the classifier and recall of the classification performed by the classifier.

5. The analysis system according to claim 3,
wherein the at least one processor is further configured to execute the instructions to perform determination of the event type based on a classification result of the classifier, and
accept second input regarding a classification threshold of the determination of the event type.

6. The analysis system according to claim 1, wherein the at least one processor is further configured to execute the instructions to generate third display information used for displaying a mixing rate of a plurality of the event types in classification performed by the classifier, and display the third display information.

7. The analysis system according to claim 6, wherein the at least one processor is further configured to execute the instructions to accept third input for merging the plurality of the event types.

8. The analysis system according to claim 1, wherein the first display information is generated so that the first time-series data, the second time-series data, and the third time-series data are displayed so as to be further arranged in a first direction when displayed.

9. The analysis system according to claim 1, wherein the at least one processor is further configured to execute the instructions to generates fourth display information for displaying based on a feature amount of the first time-series data, a feature amount of the second time-series data, and a feature amount of the third time-series data.

10. An analysis method comprising:
performing classification of an event type on time-series data that has been input, by using a classifier;
generating first display information for displaying first time-series data that is a part of the input time-series data and has been classified by the classifier as a first event type corresponding to a first state in which a target event is occurring, second time-series data associated in advance with the first event type, and third time-series data associated in advance with a second event type corresponding to a second state in which the target event is not occurring;
displaying the first information; and
accepting, from a user, first input regarding association of the event type with the first time-series data, wherein the first display information is generated so that:
each of a plurality of the first time-series data, a plurality of the second time-series data, and a plurality of the third time-series data are arranged in a second direction when displayed, and
the plurality of first time-series data are further ordered in importance in training of the classifier when displayed, and wherein the importance is a degree of contribution when the association of the event type with the first time-series data is performed for each of the plurality of the first time-series data, and the importance is used for the training of the classifier.

11. A non-transitory storage medium storing a program that when executed by a computer causes the computer to perform:
performing classification of an event type on input time-series data that has been input, by using a classifier;
generating first display information used for displaying first time-series data that is a part of the input time-series data and has been classified by the classifier as a first event type corresponding to a first state in which a target event is occurring, second time-series data associated in advance with the first event type, and third time-series data associated in advance with a second event type corresponding to a second state in which the target event is not occurring;
displaying the first information; and
accepting, from a user, first input regarding association of the event type with the first time-series data, wherein the first display information is generated so that:
each of a plurality of the first time-series data, a plurality of the second time-series data, and a plurality of the third time-series data are arranged in a second direction when displayed, and
the plurality of first time-series data are further ordered in importance in training of the classifier when displayed, and wherein the importance is a degree of contribution when the association of the event type with the first time-series data is performed for each of the plurality of the first time-series data, and the importance is used for the training of the classifier.

* * * * *